US010282201B2

(12) United States Patent
Tekade et al.

(10) Patent No.: US 10,282,201 B2
(45) Date of Patent: May 7, 2019

(54) DATA PROVISIONING TECHNIQUES

(71) Applicant: Actifio, Inc., Waltham, MA (US)

(72) Inventors: Uday Tekade, Westford, MA (US);
Xiangdong Zhang, Wellesley, MA
(US); Sachindra Kumar, Framingham,
MA (US); Madhav Mutalik,
Southborough, MA (US); **Yeganjaiah
Gottemukkula**, Lexington, MA (US);
Yong-Min Chen, Waltham, MA (US);
Ankur Bhargava, Wayland, MA (US);
Dongjun Sun, Acton, MA (US)

(73) Assignee: Actifo, Inc., Waltham, MA (US)

( * ) Notice: Subject to any disclaimer, the term of this patent is extended or adjusted under 35 U.S.C. 154(b) by 195 days.

(21) Appl. No.: 15/142,880

(22) Filed: Apr. 29, 2016

(65) Prior Publication Data
US 2016/0321339 A1 Nov. 3, 2016

Related U.S. Application Data

(60) Provisional application No. 62/155,198, filed on Apr. 30, 2015.

(51) Int. Cl.
*G06F 17/30* (2006.01)
*G06F 8/76* (2018.01)
*G06F 11/14* (2006.01)

(52) U.S. Cl.
CPC ............ *G06F 8/76* (2013.01); *G06F 11/1446* (2013.01); *G06F 2201/815* (2013.01); *G06F 2201/84* (2013.01)

(58) Field of Classification Search
CPC .. G06F 8/76; G06F 11/1446; G06F 2201/815; G06F 2201/84
(Continued)

(56) References Cited

U.S. PATENT DOCUMENTS 4,626,829 A 12/1986 Hauck
5,381,545 A 1/1995 Baker et al.
(Continued)

OTHER PUBLICATIONS

Alapati, "NetApp Technical Report: SnapMirror Sync and SnapMirror Semi-Sync Overview and Design Considerations," NetApp, Jul. 2010 (24 pages).
(Continued)

*Primary Examiner* — Hares Jami
(74) *Attorney, Agent, or Firm* — Wilmer Cutler Pickering Hale and Dorr LLP

(57) ABSTRACT

Systems and methods are provided for automating a provision of applications from a source to a target by providing a virtual copy of application data, wherein the virtual copy can be adapted to a plurality of different target environments. Versions of source application data from an application database at a source production server are maintained at times associated with a schedule. Data associated with a request is received from a user to provision the source application data for a target environment at a target server, the request further comprising application specific parameters that define necessary requirements for the target environment. A virtual copy of the source application data is presented to the target server. Instructions to the target server are transmitted that define how to restore an operational server database from the virtual copy based on the application specific parameters to meet the requirements of the target environment.

20 Claims, 19 Drawing Sheets

(58) Field of Classification Search
USPC .................. 707/609, 636, 638, 639, 831
See application file for complete search history.

(56) References Cited

U.S. PATENT DOCUMENTS

| | | | |
|---|---|---|---|
| 5,410,667 A | 4/1995 | Belsan et al. | |
| 5,497,483 A | 3/1996 | Beardsley et al. | |
| 5,535,381 A | 7/1996 | Kopper | |
| 5,819,292 A | 10/1998 | Hitz et al. | |
| 5,828,876 A | 10/1998 | Fish et al. | |
| 5,857,208 A | 1/1999 | Ofek | |
| 5,963,962 A | 10/1999 | Hitz et al. | |
| 6,065,018 A | 5/2000 | Beier et al. | |
| 6,081,875 A | 6/2000 | Clifton et al. | |
| 6,119,208 A | 9/2000 | White et al. | |
| 6,131,148 A | 10/2000 | West et al. | |
| 6,148,412 A | 11/2000 | Cannon et al. | |
| 6,163,856 A | 12/2000 | Dion et al. | |
| 6,192,444 B1 | 2/2001 | White et al. | |
| 6,199,146 B1 | 3/2001 | Pence | |
| 6,202,071 B1 | 3/2001 | Keene | |
| 6,212,531 B1 | 4/2001 | Blea et al. | |
| 6,226,759 B1 | 5/2001 | Miller et al. | |
| 6,269,381 B1 | 7/2001 | St Pierre et al. | |
| 6,269,431 B1 | 7/2001 | Dunham | |
| 6,324,548 B1 | 11/2001 | Sorenson | |
| 6,330,614 B1 | 12/2001 | Aggarwal et al. | |
| 6,434,681 B1 | 8/2002 | Armangau | |
| 6,460,055 B1 | 10/2002 | Midgley et al. | |
| 6,484,186 B1 | 11/2002 | Rungta | |
| 6,487,561 B1 | 11/2002 | Ofek et al. | |
| 6,557,089 B1 | 4/2003 | Reed et al. | |
| 6,625,704 B2 | 9/2003 | Winokur | |
| 6,654,772 B1 | 11/2003 | Crow et al. | |
| 6,654,912 B1 | 11/2003 | Viswanathan et al. | |
| 6,665,815 B1 | 12/2003 | Goldstein et al. | |
| 6,668,264 B1 | 12/2003 | Patterson et al. | |
| 6,772,302 B1 | 8/2004 | Thompson | |
| 6,779,094 B2 | 8/2004 | Selkirk et al. | |
| 6,823,336 B1 | 11/2004 | Srinivasan et al. | |
| 6,823,436 B2 | 11/2004 | Krishnamurthy | |
| 6,850,929 B2 | 2/2005 | Chang et al. | |
| 6,898,688 B2 | 5/2005 | Martin et al. | |
| 6,915,397 B2 | 7/2005 | Lubbers et al. | |
| 6,928,526 B1 | 8/2005 | Zhu et al. | |
| 6,948,039 B2 | 9/2005 | Biessener et al. | |
| 6,957,362 B2 | 10/2005 | Armangau | |
| 7,072,916 B1 | 7/2006 | Lewis et al. | |
| 7,143,251 B1 | 11/2006 | Patterson | |
| 7,222,194 B2 | 5/2007 | Kano et al. | |
| 7,325,111 B1 | 1/2008 | Jiang | |
| 7,346,623 B2 | 3/2008 | Prahlad et al. | |
| 7,386,695 B2 | 6/2008 | Fuente | |
| 7,428,657 B2 | 9/2008 | Yamasaki | |
| 7,647,355 B2 | 1/2010 | Best et al. | |
| 7,689,633 B1 | 3/2010 | Li et al. | |
| 7,707,184 B1 | 4/2010 | Zhang et al. | |
| 7,814,128 B2 | 10/2010 | Silvers et al. | |
| 7,937,547 B2 | 5/2011 | Liu et al. | |
| 8,037,032 B2 | 10/2011 | Pershin et al. | |
| 8,117,493 B1* | 2/2012 | Fultz .................. | G06F 11/2028 714/6.23 |
| 8,139,575 B2 | 3/2012 | Biran et al. | |
| 8,150,808 B2 | 4/2012 | Zha et al. | |
| 8,180,740 B1 | 5/2012 | Stager et al. | |
| 8,180,742 B2 | 5/2012 | Claudatos et al. | |
| 8,299,944 B2 | 10/2012 | Provenzano | |
| 8,407,191 B1 | 3/2013 | Nanda | |
| 8,706,833 B1 | 4/2014 | Bergant et al. | |
| 8,788,769 B2 | 7/2014 | Abercrombie et al. | |
| 9,098,432 B1 | 8/2015 | Bachu et al. | |
| 9,286,482 B1* | 3/2016 | Dumont .................. | G06F 21/32 |
| 9,436,556 B2* | 9/2016 | Siden .................. | G06F 11/1448 |
| 9,880,757 B1* | 1/2018 | Banerjee .............. | G06F 3/0619 |
| 2002/0129214 A1 | 9/2002 | Sarkar | |
| 2003/0101321 A1 | 5/2003 | Ohran | |
| 2003/0140070 A1 | 7/2003 | Kaczmarski et al. | |
| 2004/0199570 A1 | 10/2004 | Terao | |
| 2005/0066095 A1 | 3/2005 | Mullick et al. | |
| 2005/0165794 A1 | 7/2005 | Mosescu | |
| 2006/0074945 A1 | 4/2006 | Mori | |
| 2006/0179082 A1* | 8/2006 | Boyd .................. | G06F 11/1662 |
| 2009/0222496 A1 | 9/2009 | Liu et al. | |
| 2011/0258161 A1 | 10/2011 | Constantinescu et al. | |
| 2012/0123999 A1 | 5/2012 | Ashutosh et al. | |
| 2013/0054812 A1* | 2/2013 | DeCoteau .............. | H04W 4/50 709/226 |
| 2013/0339643 A1* | 12/2013 | Tekade .............. | G06F 17/30581 711/162 |
| 2015/0142747 A1* | 5/2015 | Zou .................... | G06F 11/1464 707/649 |
| 2015/0212896 A1* | 7/2015 | Pawar .................. | G06F 11/1448 707/648 |

OTHER PUBLICATIONS

American Megatrends, Inc., "StorTrends/ManageTrends® (Version 2.7) User's Guide for the StorTends 1300 Storage Appliance" Mar. 23, 2009 (378 pages).
Arrell et al., "Using RVA and SnapShot for Business Intelligence Applications with OS/390 and DB2," IBM, Redbooks, Aug. 1998 (70 pages).
Azagury et al., "Point-in-Time Copy: Yesterday, Today and Tomorrow," IBM Research Lab in Haifa, No Date Listed (pp. 259-270).
Baird, "Virtual Storage Architecture Guide (VSAG)," IEEE, No Month Listed 1995 (pp. 312-326).
Baker, "Disk-Based Mirroring is a Lot More Than Just Safe," Computer Technology Review, No Month Listed 2000 (pp. 55-57).
Brown et al., "SnapMirror and SnapRestore: Advances in Snapshot Technology," retrieved online at [URL:<<https://web.archive.org/web/20111126183455/http://www.netapp.com/tech_library/3043.html>>] No Date Listed (13 pages).
Cederqvist et al., "Version Management with CVS," No Month Listed 1992 (122 pages).
Chang et al., "Performance Analysis of Two Frozen Image Based Backup/Restore Methods," IEEE International Conference on Electron Information Technology 2005, May 22-25, 2005 (7 pages).
Chapman et al., "SnapMirror® Best Practices Guide," Network Appliance, Inc., Apr. 2006 (63 pages).
Chatterjee et al., "Efficient Replication Leveraging Information Lifecycle Management in Data Storage Systems," Provisional Patent Application No. Not Available, Feb. 9, 2009 (25 pages).
Chervenak et al., "Protecting File Systems: A Survey of Backup Techniques," Sixth Goddard Conference on Mass Storage Systems and Technologies, Fifteenth IEEE Symposium on Mass Storage Systems, College Park, Maryland, Mar. 23-26, 1998 (17 pages).
Chutani et al., "The Episode File System," Usenix Association, Proceedings of the Winter 1992 Usenix Conference, San Francisco, California, Jan. 20-24, 1992 (19 pages).
CommVault, "CommVault® Simpana® Quick Recovery® Software for Critical Data Center Applications and File Systems," No Month Listed 2010 (35 pages).
Dantz Development Corporation, "Retrospect® User's Guide," No Month Listed 2002 (262 pages).
Degwekar, "Using SnapMirror® with SnapDrive® for Unix®," No Month Listed 2007 (11 pages).
Delphix Corp.'s Invalidity Contentions Under Patent L.R. 3-3, Jul. 24, 2014 (27 pages).
Edwards et al., "FlexVol: Flexible, Efficient File Volume Virtualization in WAFL," Usenix Association, Usenix '08: 2008 Usenix Annual Technical Conference, No Month Listed 2008 (pp. 129-142).
You et al., "Deep Store: An Archival Storage System Architecture," Proceedings of the 21st International Conference on Data Engineering, No Month Listed 2005 (12 pages).
Zhang et al., "yFS: A Journaling File System Design for Handling Large Data Sets with Reduced Seeking," Usenix Association, Pro-

(56) References Cited

OTHER PUBLICATIONS ceedings of FAST '03: 2nd Usenix Conference on File and Storage Technologies, San Francisco, California, Mar. 31-Apr. 2, 2003 (15 pages).
EMC, "Backup of Oracle in EMC Symmetrix Environments with EMC NetWorker PowerSnap," Aug. 2008 (25 pages).
Zhu et al., "Avoiding the Disk Bottleneck in the Data Domain Deduplication File System," Proceedings of the 6th Usenix Conference on File and Storage Technologies FAST 2008, San Jose, California, No Month Listed 2008 (14 pages).
EMC, "EMC Celerra Version 5.6 Technical Primer: SLA-Driven Replication with Celerra Replicator (V2): Technology Concepts and Business Considerations," Jul. 2008 (20 pages).
EMC, "EMC DL1500 and DL3000 with EMC NetWorker: Best Practices Planning," Jul. 2009 (36 pages).
EMC, "EMC TimeFinder Product Description Guide," No Date Listed (34 pages).
EMC, "Next-Generation Backup-to-Disk: Building the Foundation for Effective Operational Recovery Management," Jan. 31, 2005 (9 pages).
EMC, "Unified Backup and Recovery with EMC NetWorker," Mar. 2010 (16 pages).
Exhibit 1004 IPR2015-01689, Declaration of Ellie Young, Aug. 5, 2015 (24 pages).
Exhibit 1006 IPR2015-01678, Pfaffenberger, Webster's New World Computer Dictionary Ninth Edition, Hungry Minds, Inc., New York, New York, No Month Listed 2001 (4 pages).
Exhibit 1006 IPR2015-01689, File History for U.S. Appl. No. 12/947,393, filed Apr. 14, 2015 (108 pages).
Exhibit 1006v2 IPR2015-01689, Version 2, File History for U.S. Appl. No. 12/947,393, No Date Listed (177 pages).
Exhibit 1006v3 IPR2015-01689, Version 3, File History for U.S. Appl. No. 12/947,393, No Date Listed (150 pages).
Exhibit 1006v4 IPR2015-01689, Version 4, File History for U.S. Appl. No. 12/947,393, No Date Listed (98 pages).
Exhibit 1007 IPR2015-01678, Microsoft Computer Dictionary Fourth Edition, Microsoft Press, Redmond, Washington, No Month Listed 1999 (3 pages).
Exhibit 1007 IPR2015-01689, Declaration of Prashant Shenoy, Ph.D. in Support of Petition for Inter Partes Review, Aug. 5, 2015 (82 pages).
Exhibit 1008 IPR2015-01678, File History for U.S. Appl. No. 12/947,438, filed Apr. 14, 2015 (100 pages).
Exhibit 1008v2 IPR2015-01678, Version 2, File History for U.S. Appl. No. 12/947,438, No Date Listed (103 pages).
Exhibit 1009 IPR2015-01678, Declaration of Prashant Shenoy, Ph.D. in Support of Petition for Inter Partes Review, Aug. 5, 2015 (58 pages).
Exhibit 1010 IPR2015-01678, Rivest, "The MD5 Message-Digest Algorithm," retrieved online at [URL:<<https://www.ietf.org/rfc/rfc1321.txt>>] Apr. 1992 (20 pages).
Exhibit 1011 IPR2015-01678, "Secure Hash Standard," U.S. Department of Commerce, Technology Administration, National Institute of Standards and Technology, FIPS PUB 180-1, Federal Information Processing Standards Publication, Apr. 17, 1995 (24 pages).
Exhibit A-01 to Delphix Corp.'s Preliminary Invalidity and Non-Infringement Contentions, "Data Domain ("Data Domain") as Prior Art to U.S. Pat. No. 6,732,244," Jul. 3, 2015 (7 pages).
Exhibit A-02 to Delphix Corp.'s Preliminary Invalidity and Non-Infringement Contentions, "Symantec NetBackup/Veritas NetBackup ("NetBackup") as Prior Art to U.S. Pat. No. 6,732,244," Jul. 3, 2015 (7 pages).
Exhibit A-03 to Delphix Corp.'s Preliminary Invalidity and Non-Infringement Contentions, "Hitachi ShadowImage ("ShadowImage") as Prior Art to U.S. Pat. No. 6,732,244," Jul. 3, 2015 (7 pages).
Exhibit A-04 to Delphix Corp.'s Preliminary Invalidity and Non-Infringement Contentions, "U.S. Pat. No. 6,269,431 as Prior Art to U.S. Pat. No. 6,732,244," Jul. 3, 2015 (27 pages).
Exhibit A-05 to Delphix Corp.'s Preliminary Invalidity and Non-Infringement Contentions, "U.S. Pat. No. 6,915,397 ("The '397 patent") as Prior Art to U.S. Pat. No. 6,732,244," Jul. 3, 2015 (44 pages).
Exhibit A-06 to Delphix Corp.'s Preliminary Invalidity and Non-Infringement Contentions, "Hutchinson as Claim Chart for U.S. Pat. No. 6,732,244," Jul. 3, 2015 (64 pages).
Exhibit A-07 to Delphix Corp.'s Preliminary Invalidity and Non-Infringement Contentions, "Petal: Distributed Virtual Disks (Lee) as Prior Art to U.S. Pat. No. 6,732,244," Jul. 3, 2015 (35 pages).
Exhibit A-08 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-09 to Delphix Corp.'s Preliminary Invalidity and Non-Infringement Contentions, "U.S. Pat. No. 6,434,681 as Prior Art to U.S. Pat. No. 6,732,244," Jul. 3, 2015 (19 pages).
Exhibit A-10 to Delphix Corp.'s Preliminary Invalidity and Non-Infringement Contentions, "U.S. Pat. No. 7,072,916 ("The '916 patent") as Prior Art to U.S. Pat. No. 6,732,244," Jul. 3, 2015 (65 pages).
Exhibit A-11 to Delphix Corp.'s Preliminary Invalidity and Non-Infringement Contentions, "U.S. Pat. No. 6,898,688 as Prior Art to U.S. Pat. No. 6,732,244," Jul. 3, 2015 (35 pages).
Exhibit A-12 to Delphix Corp.'s Preliminary Invalidity and Non-Infringement Contentions, "Chervenak as Prior Art to U.S. Pat. No. 6,732,244," Jul. 3, 2015 (21 pages).
Exhibit A-13 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,732,244," Jul. 3, 2015 (52 pages).
Exhibit A-14 to Delphix Corp.'s Preliminary Invalidity and Non-Infringement Contentions, "Green, Designing a Fast On-line Backup System for a Log-structured File System as Prior Art to U.S. Pat. No. 6,732,244," Jul. 3, 2015 (80 pages).
Exhibit A-15 to Delphix Corp.'s Preliminary Invalidity and Non-Infringement Contentions, "U.S. Pat. No. 5,535,381 as Prior Art to U.S. Pat. No. 6,732,244," Jul. 3, 2015 (53 pages).
Exhibit A-16 to Delphix Corp.'s Preliminary Invalidity and Non-Infringement Contentions, "IBM RAMAC Virtual Array ("RAMAC" or "RVA") as Prior Art to U.S. Pat. No. 6,732,244," Jul. 3, 2015 (68 pages).
Exhibit A-17 to Delphix Corp.'s Preliminary Invalidity and Non-Infringement Contentions, "The Episode File System ("Episode") as Prior Art to U.S. Pat. No. 6,732,244," Jul. 3, 2015 (21 pages).
Exhibit A-18 to Delphix Corp.'s Preliminary Invalidity and Non-Infringement Contentions, "Informix Storage Manager and Database Servers ("Informix") as Prior Art to U.S. Pat. No. 6,732,244," Jul. 3, 2015 (34 pages).
Exhibit A-19 to Delphix Corp.'s Preliminary Invalidity and Non-Infringement Contentions, "U.S. Pat. No. 6,779,094 ("The '094 patent") as Prior Art to U.S. Pat. No. 6,732,244," Jul. 3, 2015 (44 pages).
Exhibit A-20 to Delphix Corp.'s Preliminary Invalidity and Non-Infringement Contentions, "EMC NetWorker/Legato NetWorker ("NetWorker") as Prior Art to U.S. Pat. No. 6,732,244," Jul. 3, 2015 (59 pages).
Exhibit A-21 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-22 to Delphix Corp.'s Preliminary Invalidity and Non-Infringement Contentions, "Retrospect as Prior Art to U.S. Pat. No. 6,732,244," Jul. 3, 2015 (12 pages).
Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," Jul. 3, 2015 (25 pages).
Exhibit B-01 to Delphix Corp.'s Preliminary Invalidity and Non-Infringement Contentions, "Data Domain ("Data Domain") as Prior Art to U.S. Pat. No. 6,959,369," Jul. 3, 2015 (10 pages).
Exhibit B-02 to Delphix Corp.'s Preliminary Invalidity and Non-Infringement Contentions, "Hitachi ShadowImage ("ShadowImage") as Prior Art to U.S. Pat. No. 6,959,369," Jul. 3, 2015 (10 pages).

(56) References Cited

OTHER PUBLICATIONS

Exhibit B-03 to Delphix Corp.'s Preliminary Invalidity and Non-Infringement Contentions, "U.S. Pat. No. 6,269,431 as Prior Art to U.S. Pat. No. 6,959,369," Jul. 3, 2015 (42 pages).
Exhibit B-04 to Delphix Corp.'s Preliminary Invalidity and Non-Infringement Contentions, "Green, Designing a Fast On-line Backup System for a Log-structured File System as Prior Art to U.S. Pat. No. 6,959,369," Jul. 3, 2015 (104 pages).
Exhibit B-05 to Delphix Corp.'s Preliminary Invalidity and Non-Infringement Contentions, "U.S. Pat. No. 5,535,381 as Prior Art to U.S. Pat. No. 6,959,369," Jul. 3, 2015 (84 pages).
Exhibit B-06 to Delphix Corp.'s Preliminary Invalidity and Non-Infringement Contentions, "Hutchinson as Claim Chart for U.S. Pat. No. 6,959,369," Jul. 3, 2015 (80 pages).
Exhibit B-07 to Delphix Corp.'s Preliminary Invalidity and Non-Infringement Contentions, "U.S. Patent Application No. 2003/0140070 ("The '070 application") as Prior Art to U.S. Pat. No. 6,959,369," Jul. 3, 2015 (67 pages).
Exhibit B-08 to Delphix Corp.'s Preliminary Invalidity and Non-Infringement Contentions, "U.S. Pat. No. 6,898,688 as Prior Art to U.S. Pat. No. 6,959,369," Jul. 3, 2015 (53 pages).
Exhibit B-09 to Delphix Corp.'s Preliminary Invalidity and Non-Infringement Contentions, "U.S. Pat. No. 6,434,681 as Prior Art to U.S. Pat. No. 6,959,369," Jul. 3, 2015 (44 pages).
Exhibit B-10 to Delphix Corp.'s Preliminary Invalidity and Non-Infringement Contentions, "U.S. Pat. No. 7,072,916 ("The '916 patent") as Prior Art to U.S. Pat. No. 6,959,369," Jul. 3, 2015 (59 pages).
Exhibit B-11 to Delphix Corp.'s Preliminary Invalidity and Non-Infringement Contentions, "Chervenak as Prior Art to U.S. Pat. No. 6,959,369," Jul. 3, 2015 (69 pages).
Exhibit B-12 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,959,369," Jul. 3, 2015 (54 pages).
Exhibit B-13 to Delphix Corp.'s Preliminary Invalidity and Non-Infringement Contentions, "Petal: Distributed Virtual Disks (Lee) as Prior Art to U.S. Pat. No. 6,959,369," Jul. 3, 2015 (51 pages).
Exhibit B-14 to Delphix Corp.'s Preliminary Invalidity and Non-Infringement Contentions, "U.S. Pat. No. 6,915,397 ("The '397 patent") as Prior Art to U.S. Pat. No. 6,959,369," Jul. 3, 2015 (94 pages).
Exhibit B-15 to Delphix Corp.'s Preliminary Invalidity and Non-Infringement Contentions, "IBM RAMAC Virtual Array ("Ramac" or "RVA") as Prior Art to U.S. Pat. No. 6,959,369," Jul. 3, 2015 (89 pages).
Exhibit B-16 to Delphix Corp.'s Preliminary Invalidity and Non-Infringement Contentions, "Symantec NetBackup/Veritas NetBackup ("NetBackup") as Prior Art to U.S. Pat. No. 6,959,369," Jul. 3, 2015 (65 pages).
Exhibit B-17 to Delphix Corp.'s Preliminary Invalidity and Non-Infringement Contentions, "EMC NetWorker/Legato NetWorker ("NetWorker") as Prior Art to U.S. Pat. No. 6,959,369," Jul. 3, 2015 (92 pages).
Exhibit B-18 to Delphix Corp.'s Preliminary Invalidity and Non-Infringement Contentions, "Retrospect as Prior Art to U.S. Pat. No. 6,959,369," Jul. 3, 2015 (35 pages).
Exhibit B-19 to Delphix Corp.'s Preliminary Invalidity and Non-Infringement Contentions, "EMC TimeFinder as Prior Art to U.S. Pat. No. 6,959,369," Jul. 3, 2015 (90 pages).
Exhibit B-20 to Delphix Corp.'s Preliminary Invalidity and Non-Infringement Contentions, "Informix Storage Manager and Database Servers ("Informix") as Prior Art to U.S. Pat. No. 6,959,369," Jul. 3, 2015 (70 pages).
Exhibit B-21 to Delphix Corp.'s Preliminary Invalidity and Non-Infringement Contentions, "NetApp Data Protection Solution ("NetApp") as Prior Art to U.S. Pat. No. 6,959,369," Jul. 3, 2015 (58 pages).
Exhibit B-22 to Delphix Corp.'s Preliminary Invalidity and Non-Infringement Contentions, "U.S. Pat. No. 6,119,208 to White et al. ("White") as Prior Art to U.S. Pat. No. 6,959,369," Jul. 3, 2015 (43 pages).
Friess et al., "Windows NT Backup and Recovery with ADSM," IBM, Redbooks, May 1998 (190 pages).
Galli, "Journal File Systems in Linux," Upgrade the European Online Magazine for the IT Professional, vol. 2, No. 6, Dec. 2001 (8 pages).
Garrett et al., "Syncsort Backup Express and NetApp: Advances Data Protection and Disaster Recovery," Enterprise Strategy Group, Jan. 2009 (19 pages).
Gordon, "High Noon-Backup and Recovery: What Works, What Doesn't and Why," Enterprise Systems Journal, vol. 15, No. 9, Sep. 2000 (5 pages).
Green et al., "Designing a Fast, On-Line Backup System for a Log-Structured File System," Digital Technical Journal, vol. 8, No. 2, No Month Listed 1996 (pp. 32-45).
Gu et al., "DB2 UDB Backup and Recovery with ESS Copy Services," IBM, Redbooks, Aug. 2002 (144 pages).
Hendricks et al., "Improving Small File Performance in Object-Based Storage," Parallel Data Laboratory, Carnegie Mellon University, Pittsburgh, Pennsylvania, May 2006 (21 pages).
Herrin et al., "The Viva File System," retrieved online at [URL:<<http.://www.cs.wisc.edu/~shankar/Viva/viva.html>>] Jun. 14, 1997 (26 pages).
Heyt et al., "Tivoli Storage Manager Version 3.7: Technical Guide," IBM, Redbooks, Dec. 1999 (248 pages).
Hitz et al., "File System Design for an NFS File Server Appliance," Network Appliance, Jan. 19, 1994 (23 pages).
Holton et al., "XFS: A Next Generation Journalled 64-Bit Filesystem with Guaranteed Rate I/O," retrieved online at [URL:<<http://www.sgi.com/Technology/xfs-whitepaper.html>>] Jun. 5, 1997 (15 pages).
Hutchinson, "Logical vs. Physical File System Backup," Usenix Association, Proceedings of the 3rd Symposium on Operating Systems Design and Implementation, New Orleans, Louisiana, Feb. 1999 (12 pages).
IBM, "IBM RAMAC Virtual Array," IBM, Redbooks, Jul. 1997, (490 pages).
IBM, "Setting Up and Implementing ADSTAR Distributed Storage Manager/400," IBM, Redbooks, Mar. 1995 (350 pages).
Informix Corporation, "Informix Backup and Restore Guide," Dec. 1999 (280 pages).
Informix Corporation, "Informix Storage Manager: Administrator's Guide," Dec. 1999 (166 pages).
Isilon Systems, "Backup and Recovery with Isilon IQ Clustered Storage," Aug. 2007 (19 pages).
Kara, "Ext4, btrfs and the others," Linux-Kongress, The International Linux System Technology Conference, Oct. 30, 2009 (15 pages).
Keeton et al., "A Framework for Evaluating Storage System Dependability," Proceedings of the 2004 International Conference on Dependable Systems and Networks, No Month Listed 2004 (10 pages).
Kim et al., "Volume Management in SAN Environment," IEEE, No Month Listed 2001 (pp. 500- 505).
Klivansky, "A Thorough Introduction to FlexClone™ Volumes," Network Appliance, Inc., Oct. 2004 (35 pages).
Klosterman, "Delayed Instantiation Bulk Operations for Management of Distributed, Object-Based Storage Systems," Department of Electrical and Computer Engineering, Carnegie Mellon University, Pittsburgh, Pennsylvania, Aug. 2009 (255 pages).
Kulkarni et al., "Redundancy Elimination Within Large Collections of Files," Usenix Association, Proceedings of the General Track: 2004 Usenix Annual Technical Conference, Boston, MA, Jun. 27-Jul. 2, 2004 (15 pages).
Lee et al., "A Comparison of Two Distributed Disk Systems," Systems Research Center, Palo Alto, California, Apr. 30, 1998 (25 pages).
Lee et al., "Petal: Distributed Virtual Disks," ACM, No Month Listed 1996 (pp. 84-92).
Legato, "Legato NetWorker Release 6.1 UNIX Version: Administrator's Guide," No Month Listed 2001 (638 pages).

(56) References Cited

OTHER PUBLICATIONS

Leins et al., "Tivoli Storage Manager Version 3.7.3 & 4.1: Technical Guide," IBM, Redbooks, Sep. 2000 (368 pages).
Linett et al., "The Real Problems of Backup," Fourth NASA Goddard Conference on Mass Storage Systems and Technologies, College Park, Maryland, Mar. 28-30, 1995 (13 pages).
Merrill et al., "SnapVault Best Practices Guide," NetApp, 2008 (29 pages).
Mesnier et al., "Object-Based Storage," IEEE Communications Magazine, Aug. 2003 (pp. 84-90).
Mesnier et al., "Object-Based Storage," IEEE Potentials, Apr./May 2005 (pp. 31-34).
Milligan et al., "Simplifying Management of Complex Business Operations (A Study of Mainline Storage Virtualization)," CMG 2001 Proceedings, vol. 2, Dec. 2-7, 2001 (13 pages).
Mortimer et al., "ADSM Version 3 Technical Guide," IBM, Redbooks, Dec. 1998 (384 pages).
Mortimer et al., "Using ADSM to Back Up Databases," IBM, Redbooks, Jul. 1998 (618 pages).
Mullender et al., "Immediate Files," Software—Practice and Experience, vol. 14, No. 4, Apr. 1984 (pp. 365-368).
Muller et al., "A High Performance Multi-Structured File System Design," ACM, No Month Listed 1991 (pp. 56-67).
Mushran, "OCFS2: A Cluster File System for Linux: User's Guide for Release 1.4," Jul. 2008 (44 pages).
Muthitacharoen et al., "A Low-Bandwidth Network File System," ACM, No Month Listed 2001 (pp. 174-187).
NetApp, Inc., "Data ONTAP® 7.3 Data Protection: Online Backup and Recovery Guide," Jun. 2008 (405 pages).
NetApp, Inc., "Data ONTAP® 7.3 System Administration Guide," Nov. 2010 (349 pages).
Network Appliance Inc., "Data ONTAP 10.0: Architecture Basic Concepts Guide," Nov. 2006 (18 pages).
Network Appliance Inc., "SnapManager® 2.1 for Oracle® Installation and Administration Guide," Apr. 2007 (272 pages).
Network Appliance, Inc., "Data ONTAP™ 6.3 Command Reference," Network Appliance, Inc., Sunnyvale, California, Aug. 2002 (452 pages).
Network Appliance, Inc., "Network Appliance™ SnapMirror® Software," No Month Listed 2006 (2 pages).
No Author Listed, "FDR InstantBackup™ . . . Innovation Instant Solutions," Innovation Data Processing, No Date Listed (2 pages).
Osuna et al., "Data Protection Strategies in IBM System Storage N Series," IBM, Redbooks, Jun. 2008 (90 pages).
Osuna et al., "IBM System Storage N Series SnapMirror," IBM, Redbooks, Jul. 2006 (124 pages).
Pate et al., "Implementing SnapShot," IBM, Redbooks, Jul. 1999 (214 pages).
Pate et al., "RAMAC Virtual Array, Peer-to-Peer Remote Copy, and IXFP/SnapShot for VSE/ESA," IBM, Redbooks, Jan. 1999 (84 pages).
Pate et al., "RAMAC Virtual Array: Implementing Peer-to-Peer Remote Copy," IBM, Redbooks, Dec. 1998 (140 pages).
Patterson et al., "SnapMirror®: File System Based Asynchronous Mirroring for Disaster Recovery," Usenix Association, Proceedings of the FAST 2002 Conference on File and Storage Technologies, Monterey, California, Jan. 28-30, 2002 (14 pages).
Petition for Inter Partes Review of U.S. Pat. No. 8,299,944 Under 35 U.S.C. §§ 311-319 and 37 C.F.R. §§ 42.1-.80, 42.100-.123, Aug. 6, 2015 (43 pages).
Petition for Inter Partes Review of U.S. Pat. No. 8,788,769 Under 35 U.S.C. §§ 311-319 and 37 C.F.R. §§ 42.1-.80, 42.100-.123, Aug. 7, 2015 (71 pages).
Phillips, "Zumastor Linux Storage Server," Proceedings of the Linux Symposium, vol. 2, Ottawa, Ontario, Canada, Jun. 27-30, 2007 (14 pages).
Prahlad et al., "Method for Managing SnapShots Generated by an Operating System or Other Application," U.S. Appl. No. 60/326,021, Sep. 28, 2001 (16 pages).
Quinlan et al., "Venti: A New Approach to Archival Storage," Usenix Association, Proceedings of the FAST 2002 Conference on File and Storage Technologies, Monterey, California, Jan. 28-30, 2002 (14 pages).
Sadagopan et al., "NetApp Technical Report: Oracle Fusion Middleware DR Solution Using NetApp Storage," NetApp., May 2008 (38 pages).
Sarkar, "Instant Image: Transitive and Cyclical Snapshots in Distributed Storage Volumes," Euro-Par 2000, No Month Listed 2000 (pp. 1284-1291).
Schuettinger et al., "Helping DBAs Become More Efficient: NetApp Efficiency and Manageability Advantages," NetApp, Inc., Jul. 2009 (12 pages).
No Author listed, "Network Appliance Adds SnapRestore, SnapMirror to OnTap," Computergram International, Apr. 26, 1999 (2 pages).
Solter et al., "OpenSolaris™ Bible," Wiley Publishing, Inc. Indianapolis, Indiana, No Month Listed 2009 (9 pages).
Sweeney, "xFS In-core Inode Management," retrieved online at [URL:<<http://linux-xfs.sgi.com/projects/xfs/design_docs/>>] Nov. 29, 1993 (10 pages).
Symantec Corporation, "Symantec Backup Exec Quick Recovery & Off-Host Backup Solutions for Microsoft Exchange Server 2003 & Microsoft SQL Server," No Month Listed 2005 (9 pages).
Syncsort Incorporated, "Near-Instant Oracle Cloning with Syncsort AdvancedClient Technologies," No Month Listed 2007 (12 pages).
Syncsort Incorporated, "Syncsort Backup Express Advanced Recovery for NetApp," No Month Listed 2008 (12 pages).
Tate et al., "Implementing the IBM System Storage San Volume Controller V4.3," IBM, Redbooks, Oct. 2008 (970 pages).
Thekkath et al., "Frangipani: A Scalable Distributed File System," Proceeding SOSP '97, Proceedings of the Sixteenth ACM Symposium on Operating Systems Principles, No Month Listed 1997 (25 pages).
Tretau et al., "IBM TotalStorage NAS Backup and Recovery Solutions," IBM, Redbooks, Jul. 2002 (226 pages).
Veritas Software Corporation, "Veritas File System 4.1 Administrator's Guide," May 2005 (270 pages).
Veritas Software Corporation, "Veritas FlashSnap™ Point-in-Time Copy Solutions, Administrator's Guide 4.1," Apr. 2006 (102 pages).
Veritas Software Corporation, "Veritas NetBackup 4.5 Business Server™: Getting Started Guide," Mar. 2002 (91 pages).
Veritas Software Corporation, "Veritas NetBackup™ 4.5 for Informix: System Administrator's Guide," Mar. 2002 (94 pages).
Veritas Software Corporation, "Veritas NetBackup™ 4.5: User's Guide for UNIX," Mar. 2002 (212 pages).
VMware, "VMware Consolidated Backup: Best Practices and Deployment Considerations for SAN Environments," retrieved online at [URL:<<https://web.archive.org/web/20080804070141/http://www.vmware.com/files/pdf/vcb_best_practices>>] No Month Listed 2007 (39 pages).
Wolf, "VM Backup Bliss? The State of VM Data Protection in the Enterprise," Burton Group, . Midvale, Utah, Aug. 1, 2007 (45 pages).

* cited by examiner

```
<app-class name="SQLServer" friendly-name="SQL Server" description="SQL Server database">
  <provisioning-options>
    <provisioning-option name="sqlinstance" type="editable_select" label="SQL Server Instance Name"
      description="Name of target SQL Server Instance" required="true"
      classname="PsrvAppStackCommand" methodname="authaListInstances"/>
    <provisioning-option name="dbname" type="string" label="SQL Server Database Name"
      description="Name of target SQL Server Database" required="true"/>
    <provisioning-option name="recover" type="boolean" label="Recover Database After Restore"
      description="Bring database online after restore operation" required="true" default-value="true"/>
    <provisioning-option name="username" type="string" label="User Name" description="User name for database provisioning"
      group="login"/>
    <provisioning-option name="password" type="encrypt" label="Password"
      description="Password for user" group="login"/>
  </provisioning-options>
  <provisioning-script name="script name" required="false"/>
</app-class>
```

FIG. 5

```
<app-class name="SQLServerGroup" friendly-name="SQL Server Group"
    description="Consistency group including SQL Server Databases and optionally one or more filesystems
applications">
  <provisioning-options>
    <provisioning-option name="ConsistencyGroupName" type="string" label="Name of Consistency Group"
        description="Name of Consistency Group" required="true"/>
    <provisioning-option name="sqlinstance" type="editable_select" label="SQL Server Instance Name"
        description="Name of target SQL Server Instance" required="true"
        classname="PsrvAppStackCommand" methodname="authaListInstances"/>
    <provisioning-option name="dbnameprefix" type="string" label="Prefix for SQL Server Database Name"
        description="Prefix for target SQL Server Database Name" required="true"/>
    <provisioning-option name="recover" type="boolean" label="Recover Database After Restore"
        description="Bring database online after restore operation" required="true" default-value="true"/>
    <provisioning-option name="username" type="string" label="User Name" description="User name for database
provisioning"
        group="login"/>
    <provisioning-option name="password" type="encrypt" label="Password"
        description="Password for user" group="login"/>
  </provisioning-options>
  <provisioning-script name="script name" required="false"/>
</app-class>
```

| User Data Access Level | All | Nonsensitive |
|---|---|---|
| Sensitive Application | Can view, can perform actions | Can view, cannot perform actions |
| Nonsensitive Application | Can view, can perform actions | Can view, can perform actions |
| Sensitive backup | Can view, can perform actions | Cannot view |
| Non-sensitive backup | Can view, can perform actions | Can view, can perform actions |

FIG. 10

DATA PROVISIONING TECHNIQUES

CROSS-REFERENCE TO RELATED APPLICATIONS

This application claims priority to U.S. Provisional Application No. 62/155,198, filed Apr. 30, 2015, entitled "Data Provisioning Techniques," the contents of which are incorporated herein in its entirety.

TECHNICAL FIELD

The subject matter disclosed in this application generally relates to data provisioning techniques, and in particular provisioning new environments using virtual copies of production data.

BACKGROUND

In a typical enterprise, there are different application environments. There is a production environment that is typically used to provide some sort of service to customers of the enterprise. There is a development environment that is used by application development team to develop applications that are deployed in production and other environments. There is quality assurance (QA) environment that is used by QA team for testing applications. There may be other application environments as well that are used for specific purposes.

A production application environment is typically critical to the operation of a business. Any changes to this environment go through a strict change management process to reduce impact on business operations. Development or testing activities are typically not allowed in production environment.

For an application development, a development team may need access to data (typically stored in databases but it can be stored in other forms as well). The data is usually generated by applications running in the production environment.

To enable development activities, production data needs to be periodically captured and transferred to development, QA and other environments.

Typically, each developer and each QA team member needs an independent copy of data for their work. Traditionally, each development environment is provisioned by making a copy of production data and restoring it in the target development environment. In this scheme, each development environment consumes the same amount of storage as a production environment. Also, the larger the application data is in size, the longer it takes to provision a development environment using this traditional process.

In the traditional provisioning process, many people such as storage administrators (e.g., to provision storage), server administrators (e.g., to mount storage on the target server), and network administrators (e.g., to make required network changes) need to be involved to provision each development environment. This requires handoff from one person to another and increases the time required to provision a development environment and consequently increases the time required to develop applications. This delay in application development may cost businesses dearly in a competitive environment.

Production data often contains sensitive information such as social security numbers, credit card numbers, bank account numbers etc. Often, businesses have a fiduciary duty to safeguard such information. As such, the sensitive information often needs to be either removed or masked from production data before the data is given to a development or QA team for development projects. This requires businesses to set up data masking environments, allocate storage resources for masking production data and have someone oversee the process of masking to ensure that non-authorized personnel cannot get access to sensitive data.

As described above, the traditional process of managing copies of production data involves several manual steps and is not associated with many safeguards. Proliferation of copies of production data may result in non-authorized personnel gaining access to sensitive data thereby increasing business exposure to lawsuits.

Development teams and QA teams also have a need to save their ongoing work periodically to protect them from failures. Traditionally, this is accomplished by making additional copies of originally copied but slightly modified production data. This increases storage consumption and associated overheads even further.

SUMMARY

In accordance with the disclosed subject matter, systems, methods, and non-transitory computer-readable media are provided for automating a provision of applications from a source to a target by providing a virtual copy of application data, wherein the virtual copy can be adapted to a plurality of different target environments.

The disclosed subject matter includes a computerized method for automating a provision of applications from a source to a target by providing a virtual copy of application data, wherein the virtual copy can be adapted to a plurality of different target environments. In some embodiments, the computerized method includes maintaining, by a computing device, versions of source application data from an application database at a source production server at times associated with a schedule, wherein a first version of the source application data includes a full copy of the source application data and a subsequent version of the source application data include changes between the subsequent version and a version of the source application data prior to the subsequent version. In some embodiments, the computerized method includes receiving, by the computing device, data associated with a request from a user to provision the source application data for a target environment at a target server, the request further comprising application specific parameters that define necessary requirements for the target environment. In some embodiments, the computerized method includes presenting, by the computing device, a virtual copy of the source application data to the target server, the virtual copy comprising a snapshot of at least one version of the source application data. In some embodiments, the computerized method includes transmitting, by the computing device, instructions to the target server that define how to restore an operational server database from the virtual copy based on the application specific parameters to meet the requirements of the target environment.

In some embodiments, the virtual copy further comprises a plurality of storage logical unit numbers (LUN) and wherein the instructions include bringing the plurality of storage LUN online, and mounting the storage LUN in a format that is the same as a source application format. In some embodiments, the source application format comprises at least one of a raw device and a file system.

In some embodiments, the computerized method includes determining, by the computing device, at least one sensitivity attribute associated with the source application. scrubbing, by the computing device, the source application data to form at least one scrubbed data level copy of the source application data, each of the at least one scrubbed data level copy associated with a level of scrubbing of sensitive data associated with each of the at least one sensitivity attribute. In some embodiments, the computerized method includes determining, by the computing device, a user data access level associated with the request. In some embodiments, the computerized method includes providing, by the computing device, access to one of the source application or one of the at least one scrubbed data level copy based on the user data access level. In some embodiments, the application database at the source production server further comprises additional application data, the additional application data associated with an additional application data sensitivity attribute. In some embodiments, the computerized method further comprises determining, by the computing device, the sensitivity attribute of the additional application data does not match the user data access level, and denying, by the computing device, access by the user to the additional application data.

In some embodiments, the source application data includes data associated with an application class, and the application class defines the application specific parameters. In some embodiments, the operational server database is used for at least one of test and development, a database integrity check, generating reports, and analytics. In some embodiments, the application database comprises at least one of an SQL server database, an Oracle database, and a DB2 database.

In some embodiments, the systems, methods, and non-transitory computer-readable media described herein for automating a provision of applications from a source to a target by providing a virtual copy of application data, wherein the virtual copy can be adapted to a plurality of different target environments is used to provision an additional virtual application from the operational server database to meet the requirements of an additional target environment.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 5 is a table illustrating a sample definition of an application class, according to some embodiments of the present disclosure.

FIG. 6 is another table illustrating a sample definition of an application class, according to some embodiments of the present disclosure.

FIG. 10 is an exemplary table illustrating access control, according to some embodiments of the present disclosure.

DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

In this patent disclosure, systems and methods are presented for provisioning of new environments for test and development using virtual copies of production data. The systems and methods described herein can overcome many of the shortcomings of traditional method for provisioning test and development environments.

Descriptions of the systems and methods presented herein are not limited to provisioning of a test and development environment. The use of test and development environment provisioning is illustrative only. The same techniques can be used for many other use cases such as extract, transform and load (ETL) processing for data warehousing, database integrity checks, and analytics and reporting.

Figure 1:
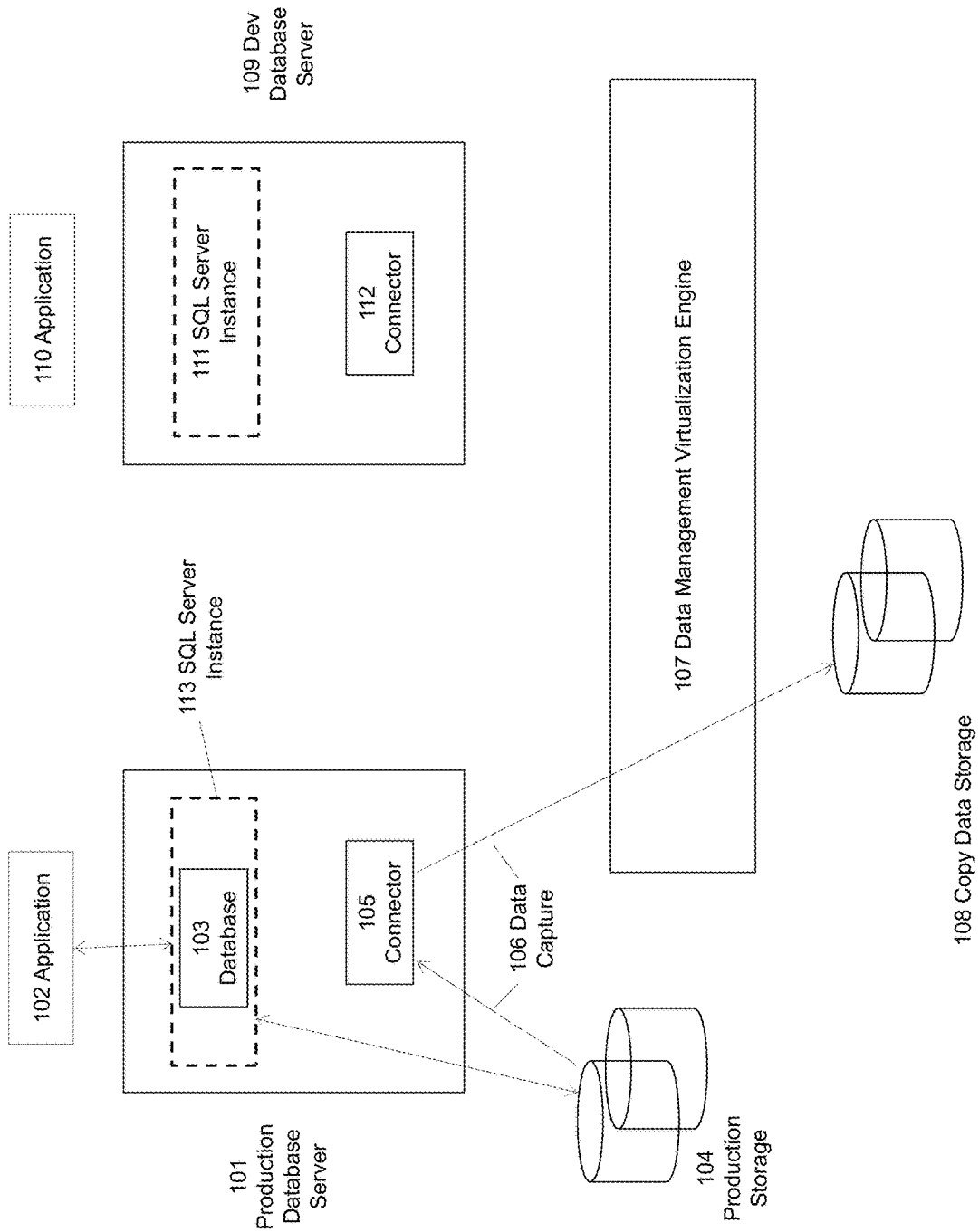
FIG. 1 is an exemplary diagram illustrating application deployments, according to some embodiments of the present disclosure.

FIG. 1 is an exemplary diagram illustrating an application deployment, according to some embodiment of the present disclosure. FIG. 1 shows production database server 101, application 102, database 103, production storage 104, connector 105, data capture 106, data management virtualization engine 107, copy data 108, development database server 109, application 110, SQL server instance 111, connector 112, and SQL server instance 113.

Production database server 101 provides database services for production. As used herein, production refers to commonly used data. In this deployment, production database server 101 has SQL Server instance 113 running within the server 101. SQL server instance 113 runs as an operating system service within production database server 101 and manages one or more databases. Production database server 101 can include multiple SQL server instances 113. While FIG. 1 shows SQL server instances 111 and 113, the techniques described herein are not limited to SQL servers and can instead be configured for any other type of database and/or database server.

SQL server instance 113 hosts an SQL server database 103. In some embodiments, a server instance 113 is a logical container for hosting one or more user databases 103. Each server instance can run as an independent process on database server that consumes resources such as CPU and memory. Databases hosted by a server instance can reside on different types of storage. As shown in FIG. 1, the SQL Server database 103 stores data files on production storage 104. That is, database 103 consumes a portion of production storage 104. In some embodiments, a server instance can also consume a portion of a virtual database provided by the data management virtualization engine 107. Application 102 uses the SQL Server database 103 for storing application data. Application 102 may also store data outside of database on the production storage 104.

Data management virtualization engine 107 (e.g., an Actifio Data Management Virtualization Engine) is used for virtualization and management of copies of production data in this environment. Data management virtualization engine 107 and connector 105 work together to capture production data from production database server 101 onto copy data storage 108. Connector 105 is a software application running on database server 101 that facilitates the process of data capture and data recovery. A connector 105 can be installed on each database server where data is either captured or restored. Data capture 106 from production environment occurs at discrete points in time per user-defined schedule. The data is captured in native application format using incremental forever capture methods described in U.S. patent application Ser. No. 12/947,385, entitled "System and method for managing data with service level agreements that may specify non-uniform copying of data," filed Nov. 16, 2010, the contents of which are incorporated herein in their entirety.

Development database server 109 runs SQL server instance 111. In some embodiments, the SQL server instance 111 does not contain any user databases prior to a user requesting a development copy via development database server 109. SQL server instance 111 remains an empty instance until a request to provision data is received from a user application 110. At that point, SQL server instance hosts databases provisioned for development projects and used by development team. Development application 110 is the interface to a user for requesting a copy of production database (e.g., from production SQL Server database 103). Connector 112 (e.g., Actifio Connector) is installed on development database server 109 for copy data virtualization. Connector 112, as described further below, is configured to restore a database instance from a virtual copy of a database stored on copy data storage 108 that is presented to the database server 109. In some embodiments, server instance 111 already contains databases. When a copy of the production database is requested, connector 112 restores a database instance with a name that is different from the existing databases.

Figure 2:
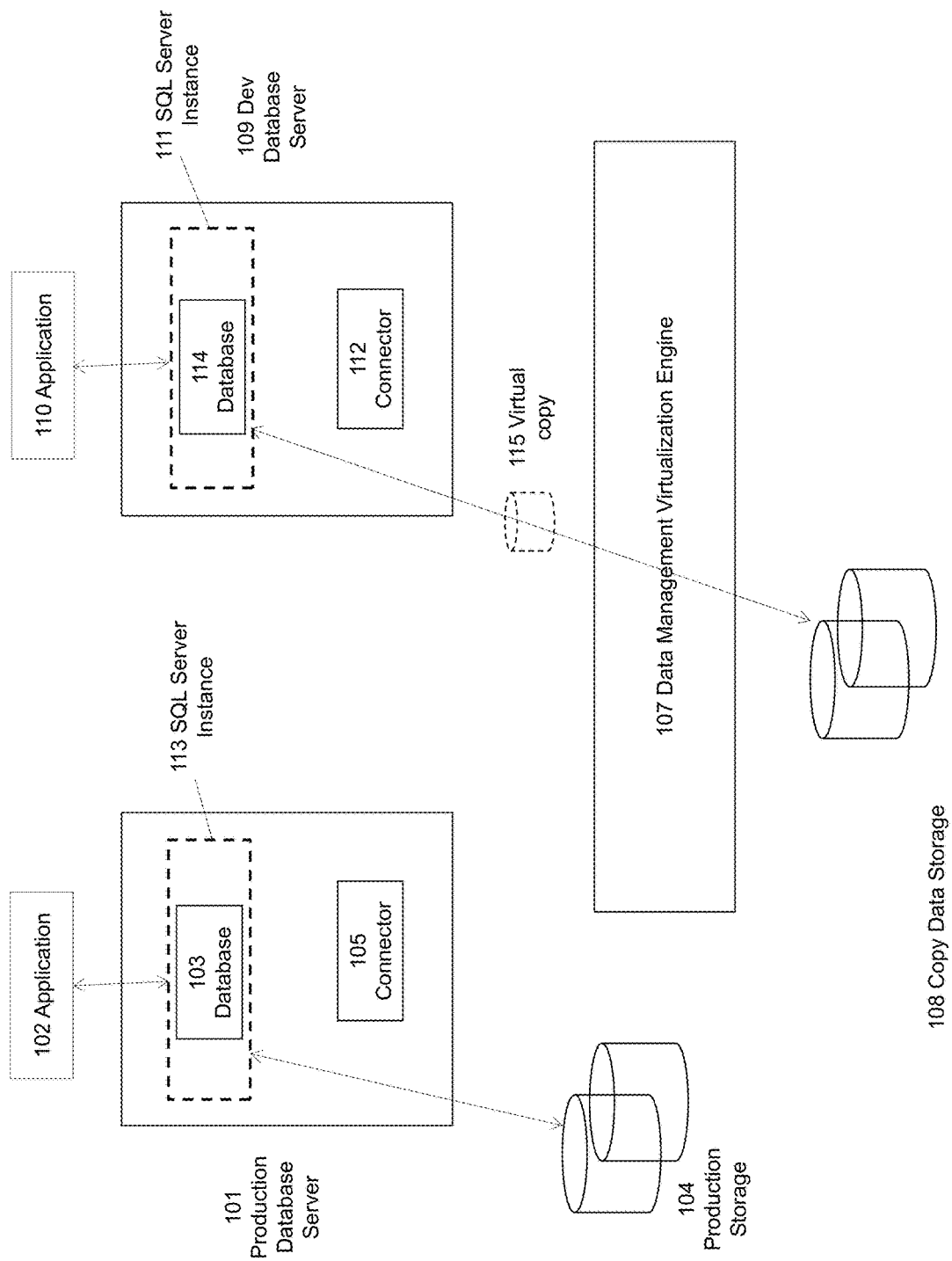
FIG. 2 is an exemplary diagram illustrating a test and development environment provisioned using a data management virtualization platform, according to some embodiments of the present disclosure.

FIG. 2 is an exemplary diagram illustrating a development environment provisioned using a data management virtualization engine, according to some embodiments of the present disclosure. Database 114 on development server 109 is a virtual copy of a point in time image of production database 103. Data files for database 114 are hosted on virtual storage volume 115 carved out of copy data storage 108 that is presented by data management virtualization engine 107. Database 114 on development server 109 does not consume any storage resources when it is provisioned, as described in more detail below.

The provisioning process for a development environment can be very quick and fully automated. In some embodiments, no manual intervention is needed for provisioning of development environment. For example, once a user starts the provisioning of a development environment (e.g., as illustrated by FIGS. 13-17), data management virtualization engine 107 creates a copy on write snapshot of disks located on copy data storage 108 that contain point in time images of production database. This snapshot 115 is then presented to target development server 109 as a set of storage (Logical Unit Number) LUN by data management virtualization engine 107 from the copy data storage 108. Data management virtualization engine 107 then instructs connector 112 running on development server 109 to bring the presented storage LUN online on the development server 109 and mount them as file systems. In some embodiments, the storage LUN is mounted in the same format as the source application format (e.g., file systems, raw device). Once the virtual copy 115 is brought online on the database server 109 so that the database server 109 can access the virtual copy 115, connector 112 then restores or renders operational SQL Server database 114 (also referred to herein as an operational server database) from presented virtual copy 115. The restore operation uses the provisioning options such as SQL Server Instance name, database name etc. specified by user for this provisioning operation. The provisioning options are the application-specific parameters specified by user for provisioning a new test or development instance, as described further herein.

Connector 112 can perform a restore of SQL server database 103 from virtual copy 115 to SQL Server instance 111 in any configuration. For example, connector 112 can restore to a standalone SQL Server instance, SQL Server Failover Instance or SQL Server Availability Group. In some embodiments, when restoring database to a clustered SQL Server Instance such as SQL Server Failover Instance, data management virtualization engine 107 presents virtual copy 115 to all database servers in cluster.

Connector 112 can perform a point in time recovery using a previously captured log backup as part of a restore operation. This allows provisioning of development environment to any desired point in time from captured production data. In some embodiments, relational databases make use of a transaction log to ensure consistency and recovery or database records in case of failures. This transaction log for each database can be backed up periodically. If transaction log is backed up and backed up logs are available at the time of restore, the database can be rolled forward to any desired point in time. Log backups are described in more detail in U.S. application Ser. No. 14/856,208, filed Sep. 16, 2015, entitled "Integrated Database and Log Backup," the content of which is incorporated herein in its entirety.

Virtual copy 115 can be presented to database server 109 as a block device using, e.g., either Fiber Channel or iSCSI storage protocol. These storage protocols can be used in enterprise environment. Provisioning of virtual development environment uses existing Fiber Channel or iSCSI storage infrastructure without needing any investment in any additional infrastructure.

The restore of database directly from virtual copy 115 avoids copying of production data for development use, allowing for simple and quick provisioning of development environments. It can substantially reduce storage resources consumed by development environments. As the provisioning of development environment is orchestrated by Data Management Virtualization Platform, no manual intervention is needed for provisioning of development environment. This speeds up provisioning of development environments and helps reduce time required to complete development projects.

Use of SQL Server database in the description of this technique is for illustration purposes only. The general technique is the same for any application with ability to specify and perform certain application specific provisioning actions. For example, for an Oracle database in an automatic storage management (ASM) configuration, connector 112 may present storage LUN as raw devices to run Oracle instance to form an ASM disk group. DB2 database is another example of a database that can be used with the systems and methods described herein.

Provisioning of any application often needs some application specific parameters to configure the application and some application specific actions to facilitate the restore. For example, to provision a new SQL Server database, a name of the SQL Server instance to restore the database to, and name of the new database are needed. Application specific actions for SQL Server can be used to restore a previously captured copy of the database to the desired SQL Server instance with the desired name.

These application specific provisioning parameters and provisioning actions can be defined using a configuration file for each application type. This design can allow one to implement a common framework to provision instance of any arbitrary application. The definition of provisioning parameters and provisioning actions is referred to as application class in this disclosure.

Figure 3:
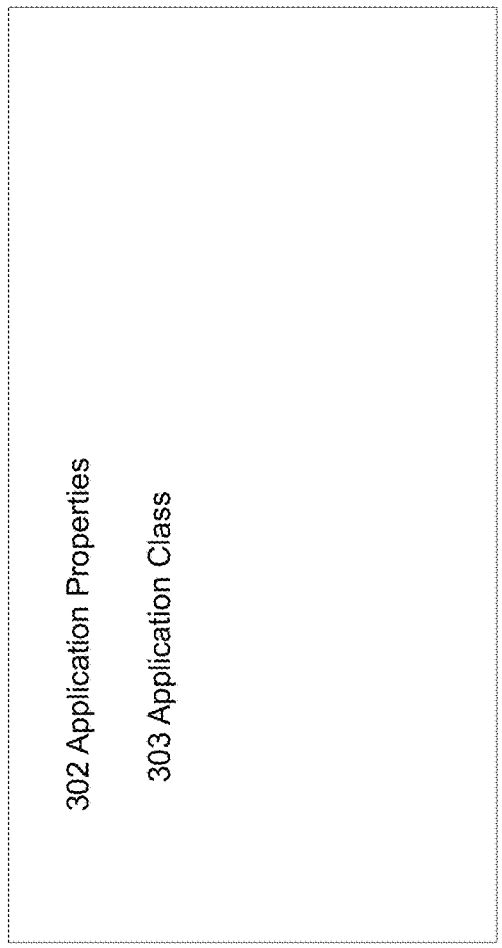
FIG. 3 is an exemplary diagram showing properties of an application, according to some embodiments of the present disclosure.

FIG. 3 is an exemplary diagram showing properties of an application, according to some embodiments of the present disclosure. Application 301 has one or more properties 302 such as name of the application, type of the application, data files used by the application, etc. An application may have an application class 303 associated with it that defines application specific provisioning options and provisioning actions needed to provision an instance of the application.

Figure 4:
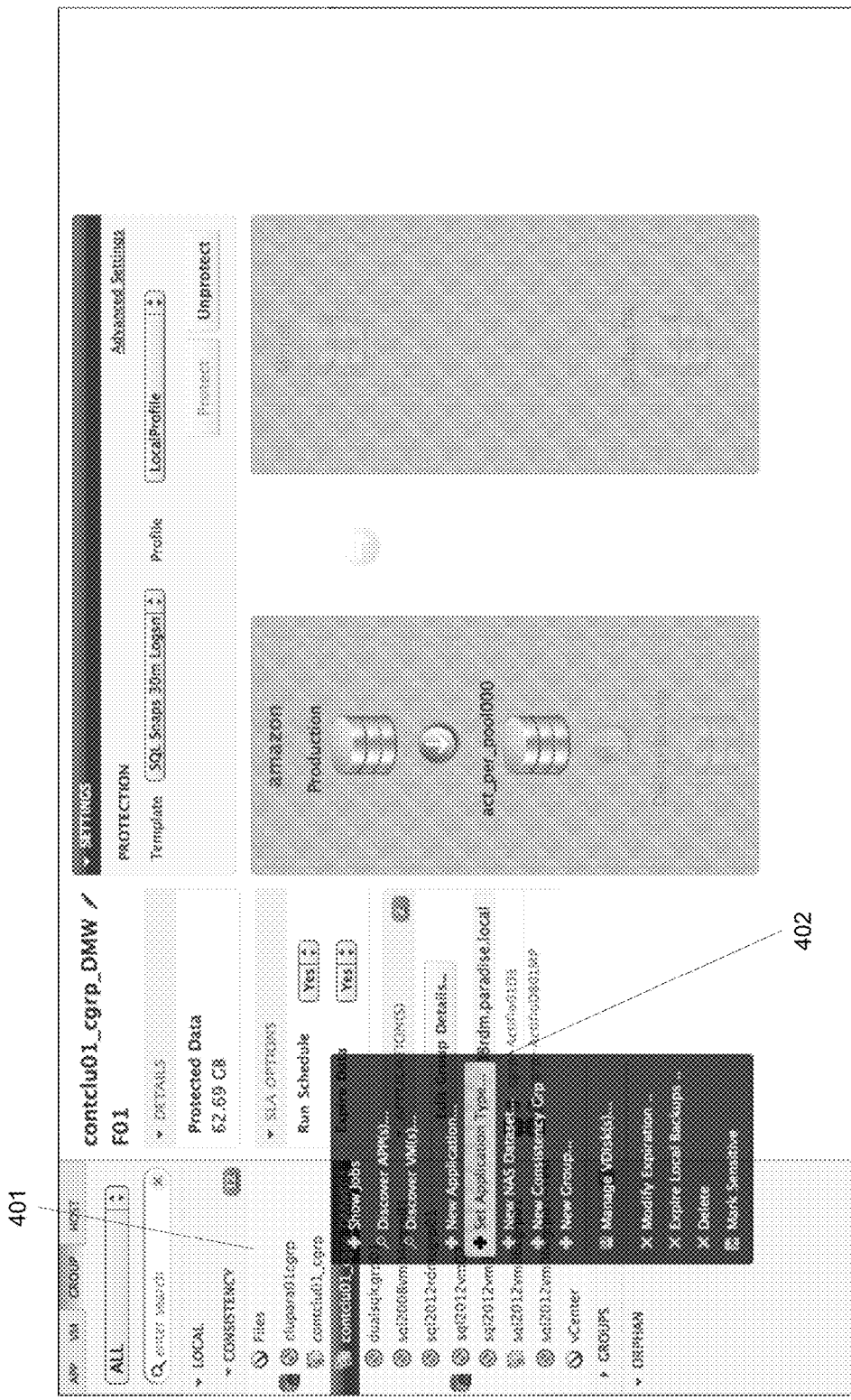
FIG. 4 is a screenshot illustrating the process of associating an application class with an application, according to some embodiments of the present disclosure.

FIG. 4 is a screenshot illustrating the action of associating an application class with an application, according to some embodiments of the present disclosure. Once an application class (also referred to herein as application type) 402 is associated with an application 401, subsequent provisioning operations automatically prompt users to specify provisioning options defined by the application class. The user specified values for provisioning options are passed to connector (e.g., connector 112 of FIG. 2) on target server for provisioning operation. Also, one or more scripts can be specified as provisioning actions for a particular class. Any scripts specified for provisioning actions can be automatically deployed on the target server to carry out provisioning actions.

FIG. 5 is a table showing a sample definition of an application class for SQL Server databases, according to some embodiments of the present disclosure. Each application class has a name and optionally friendly name 501 and description 502. The application class may define one or more provisioning options 503. Each provisioning option has set of attributes such as name, type, label, etc. The exemplary list of attributes for provisioning options shown in FIG. 5 is not exhaustive, but is shown for illustration purposes. Provisioning actions for an application class can be specified using a provisioning script. The script is specified as provisioning-script element in the application class definition.

FIG. 6 is a table illustrating a sample definition of application class for an SQL server consistency group, according to some embodiments of the present disclosure. Consistency Group is a group containing one or more SQL Server databases that are captured together at the same point in time. The friendly name 601 and description 602 indicate that the application class is a server group. Provisioning a virtual copy of consistency group may result in more than one virtual SQL Server databases getting provisioned.

An application class allows a user to customize the provisioning of an instance of an application for any purpose. One can define an application class to provision an instance of any application even if provisioning of that application is not supported natively by data management virtualization engine 107. Association of an application class with an application allows data management virtualization engine 107 to prompt users to specify application specific parameters (provisioning options) for provisioning a development environment. Data management virtualization engine 107 sends the user specified provisioning options to connector 112 on target server to provision the development environment. Connector 112 invokes the application specific actions (provisioning scripts) required for provisioning a development environment and passes provisioning options as either the environment variables or parameters to provisioning scripts. Provisioning scripts use the provisioning options to provision the desired development environment. For applications that are supported natively by connector 112, the provisioning actions needed for that application may be coded directly into the connector software. No external scripts are invoked in that case and provisioning options are interpreted by the connector itself.

Figure 7:
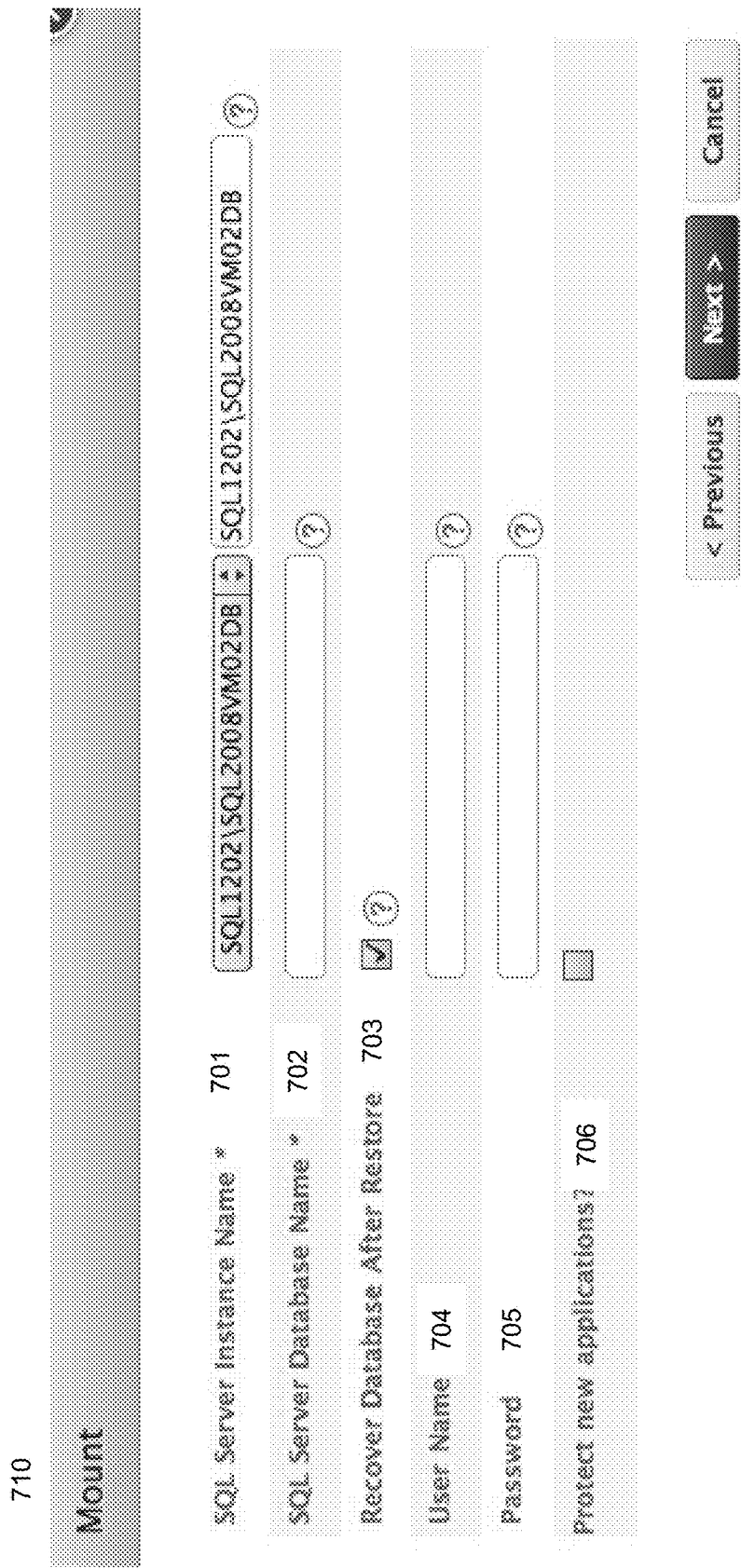
FIG. 7 shows a presentation of provisioning options for SQL Server application class to user for input for provisioning a virtual database, according some embodiments of the present disclosure.

At the time of provisioning a development environment, the provisioning options defined in an application class are presented to user for input. FIG. 7 depicts these options for SQL Server application class illustrated in FIG. 5. Values specified by user in these fields are sent to connector on target server and are used for provisioning a virtual instance of that application.

FIG. 7 shows a screenshot illustrating a user interface for a mount operation, according to some embodiments of the present disclosure. FIG. 7 shows a mount window 710, SQL server instance name 701, SQL server database name 702, recover database after restore 703, user name 704, password 705, and a protect new applications feature 706.

SQL Server Instance name 701 is the name of SQL Server Instance on target database server that will host provisioned virtual database. SQL Server database name 702 is the name of newly provisioned virtual database. Checkbox, recover database after restore 703, instructs connector to bring the newly provisioned virtual database online after it has been provisioned to desired point in time. Users can optionally specify user name 704 and password 705 to be used for provisioning virtual database. Users can also chose to capture state of their newly provisioned virtual database periodically using checkbox "Protect new application" 706.

In some embodiments, application classes are deployed within data management virtualization engine 107. The user specified provisioning options and provisioning scripts deployed with application class are transported to target server 109 by data management virtualization engine 107. This simplifies the deployment of application classes.

In some embodiments, orchestration of virtual copy provisioning for application is implemented in data management platform 107 and application specific provisioning options and provisioning actions are abstracted in application classes. This allows for provisioning of an instance of any arbitrary application type by specifying an application class to handle that application.

Production environments can be critical to business operations. So, businesses typically allow access to production environments to only authorized, privileged users. Also production data may contain sensitive information. Businesses want to allow access to sensitive data to only authorized, privileged users. Additionally, businesses may want to allow one set of data to be accessed by a particular individual (or group), while allowing a different set of data to be accessed by other individuals (or groups). The techniques described herein allow such configurations to be made for a development database.

Figure 8:
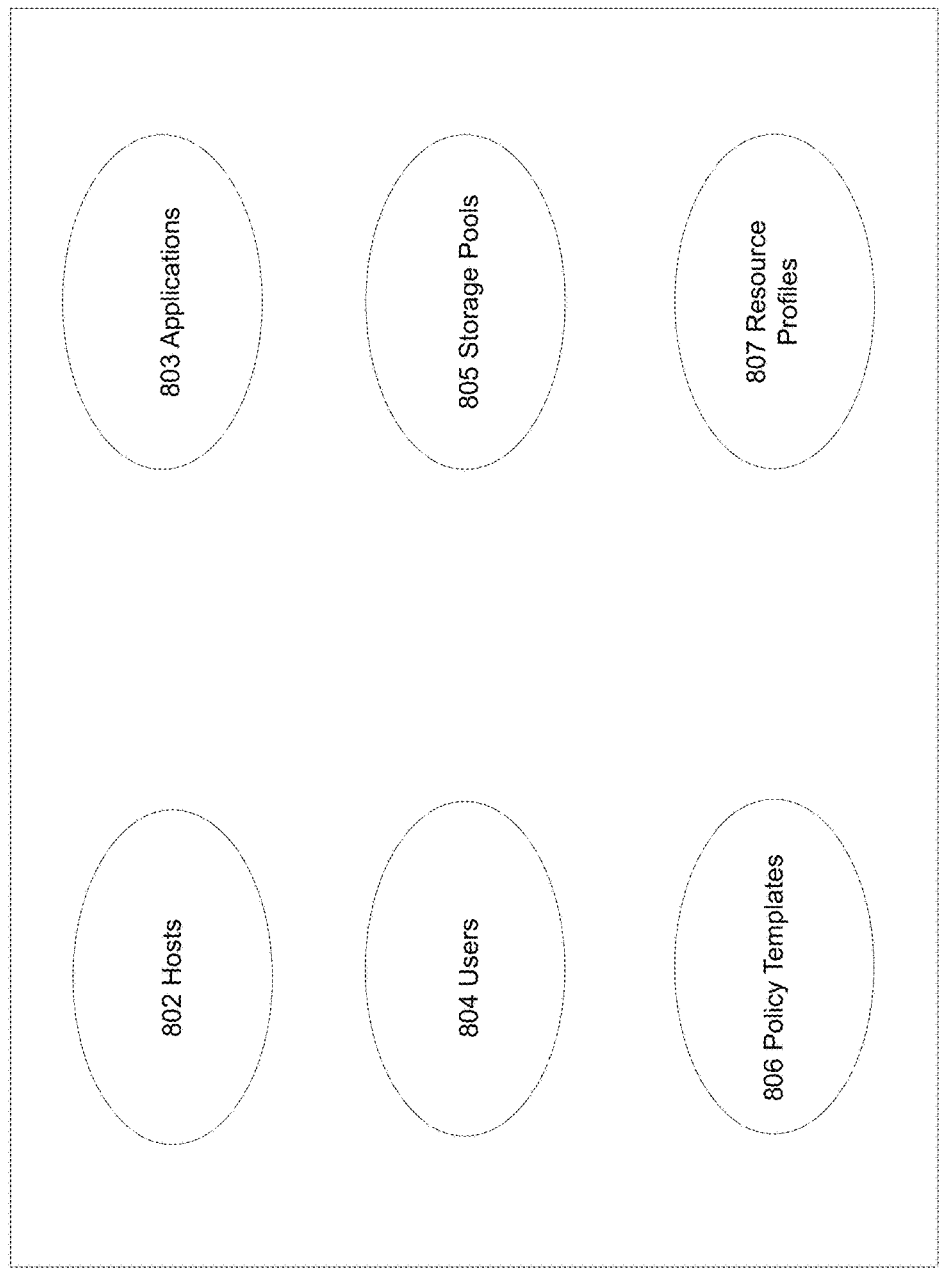
FIG. 8 is an exemplary diagram illustrating organization of resources for access control, according to some embodiments of the present disclosure.

FIG. 8 is an exemplary diagram illustrating organization of resources for access control, according to some embodiments of the present disclosure. An organization 801 can contain resources such as Hosts 802, Applications 803, Users 804, Storage Pools 805, Policy Templates 806, Resource Profiles 807. In some embodiments, a user within an organization has access to resources only within that organization. Organization of resources in this fashion allows administrators to restrict access for users to certain resources.

Hosts 802 are the servers either added manually to the data management virtualization engine or discovered in customer environment. Applications 803 are the applications such as databases, virtual machines running on hosts. Users 804 are the entities that have access to the data management virtualization engine and can perform specific actions such as provisioning a virtual database. Storage Pools 805 are groups of storage assigned to the data management virtualization engine for hosting copy data. Policy Templates 806 encapsulate rules or Service Level Agreements for managing lifecycle of copy data. Resource Profiles 807 specify location where copy data should be placed such as local pool, remote data center etc.

Figure 9:
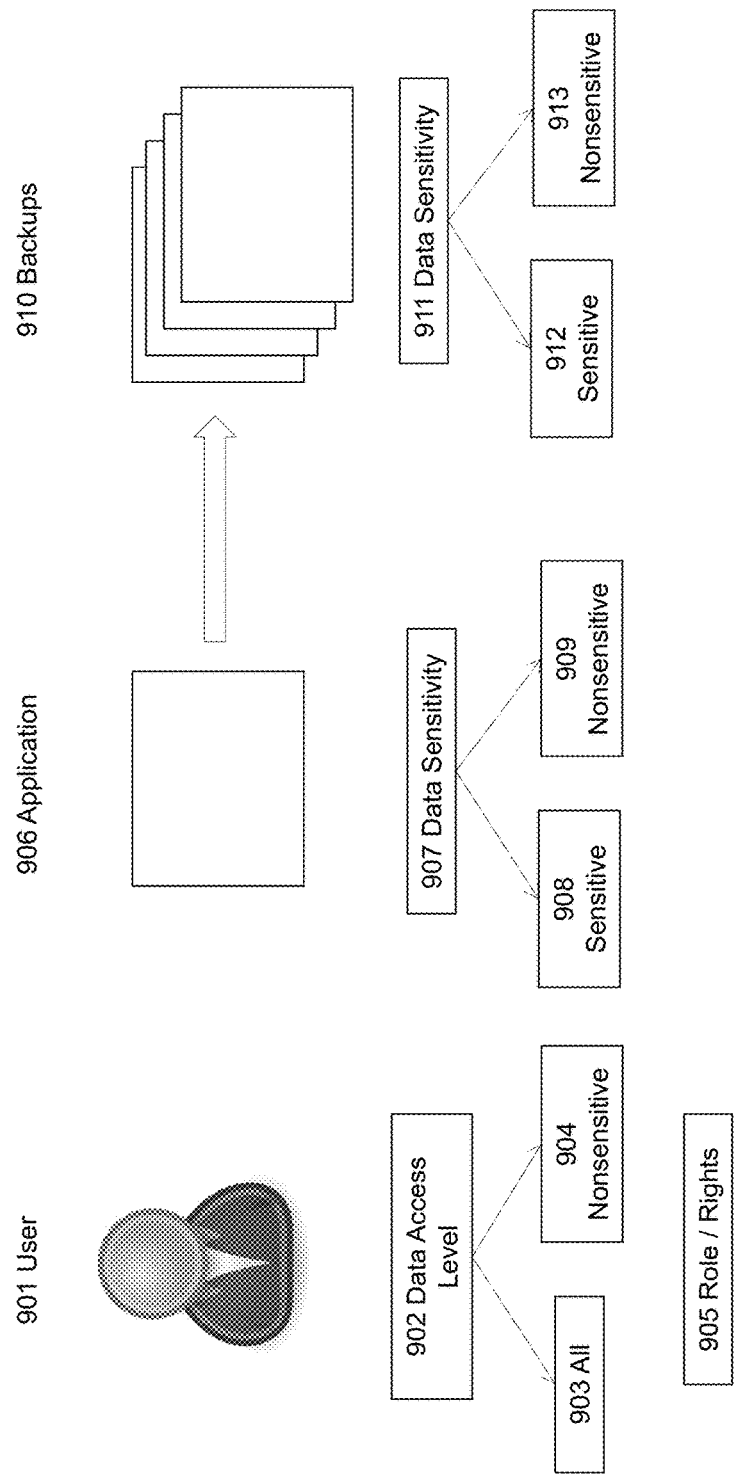
FIG. 9 is an exemplary diagram illustrating access control mechanism using data sensitivity for applications and data access levels for users, according to some embodiments of the present disclosure.

FIG. 9 is an exemplary diagram illustrating access control mechanism using data sensitivity for applications and data access levels for users, according to some embodiments of the present disclosure. A user 901 has a role 905 that grants the user certain rights. The rights in this context are rights such as 'Manage Hosts', 'Manage Applications', 'Manage Backups', 'Manage Clones', and 'Manage Mounts.' Manage Hosts' right allows user to add/remove host to/from the data management virtualization engine. "Manage Applications" right allows user to add/remove/discover applications on the hosts. "Manage Backups" right allows user to run backups, expire backups, change properties of backup such as expiration date. "Manage Clones" right allows users to create/delete clones of production data. "Manage Mounts" right allows user to mount or unmount copies of production data on the hosts the user has access to. The list of rights here is not exhaustive and is for illustration only. User also has an attribute Data Access Level 902. There could be as many data access levels as desired. In some embodiments, there are two data access levels, nonsensitive 904 and all 903. Nonsensitive 904 data access level grants user access to nonsensitive data. All data access level 903 grants user access to sensitive as well as nonsensitive data.

An application 906 has a data sensitivity 907 attribute. This attribute indicates whether application data is sensitive 908 or nonsensitive 909. In some embodiments, an application can have multiple sensitivity attributes indicating associated levels of sensitivity. For example, each level of sensitivity can correspond to different information being scrubbed (e.g., social security numbers being scrubbed only for data sensitivity level one, or social security numbers and telephone numbers being scrubbed for data sensitivity level two). In some embodiments, different scrubbed data level copies can be made associated with the different levels of sensitivity. Backups 910 for an application also have data sensitivity 911 attribute. This attribute indicates whether a particular backup image is sensitive 912 or nonsensitive 913. In some embodiments, backup image for an application inherits application's sensitivity attribute when the backup gets created.

Data access level for user and sensitivity for an application or a backup image can be changed by a privileged user such as an administrator. Typically sensitivity for a backup image can be changed after the image has been scrubbed to remove sensitive data to allow users with nonsensitive data access levels to access that backup image. Scrubbed nonsensitive backup image then can be accessed by user with nonsensitive data access level.

FIG. 10 is an exemplary table illustrating access control enforcement. Top row in the table describes user's data access level. A user's data access level includes all access 1001 and nonsensitive access 1002. Remaining rows in the table indicate access control enforcement for specific scenarios. A user with all data access level can view and perform actions on sensitive applications, nonsensitive applications, sensitive backups and nonsensitive backups. The actions this user can perform are governed by the rights the user has. User with Nonsensitive data access level can view Sensitive application but cannot perform any actions. A user with nonsensitive data access level can view and perform actions on nonsensitive applications. A user with nonsensitive data access level cannot view sensitive backups, but can view and perform actions on nonsensitive backups.

Administrators can enforce organizational policies for data access by making use of data access levels for users, data sensitivity for applications and backups and resource organizations. Applications containing sensitive data can be marked such. Users who need access to sensitive data can be assigned sensitive data access level. Everyone else is assigned nonsensitive data access level and can access data for sensitive applications only after it has been scrubbed and marked nonsensitive.

Figure 11:
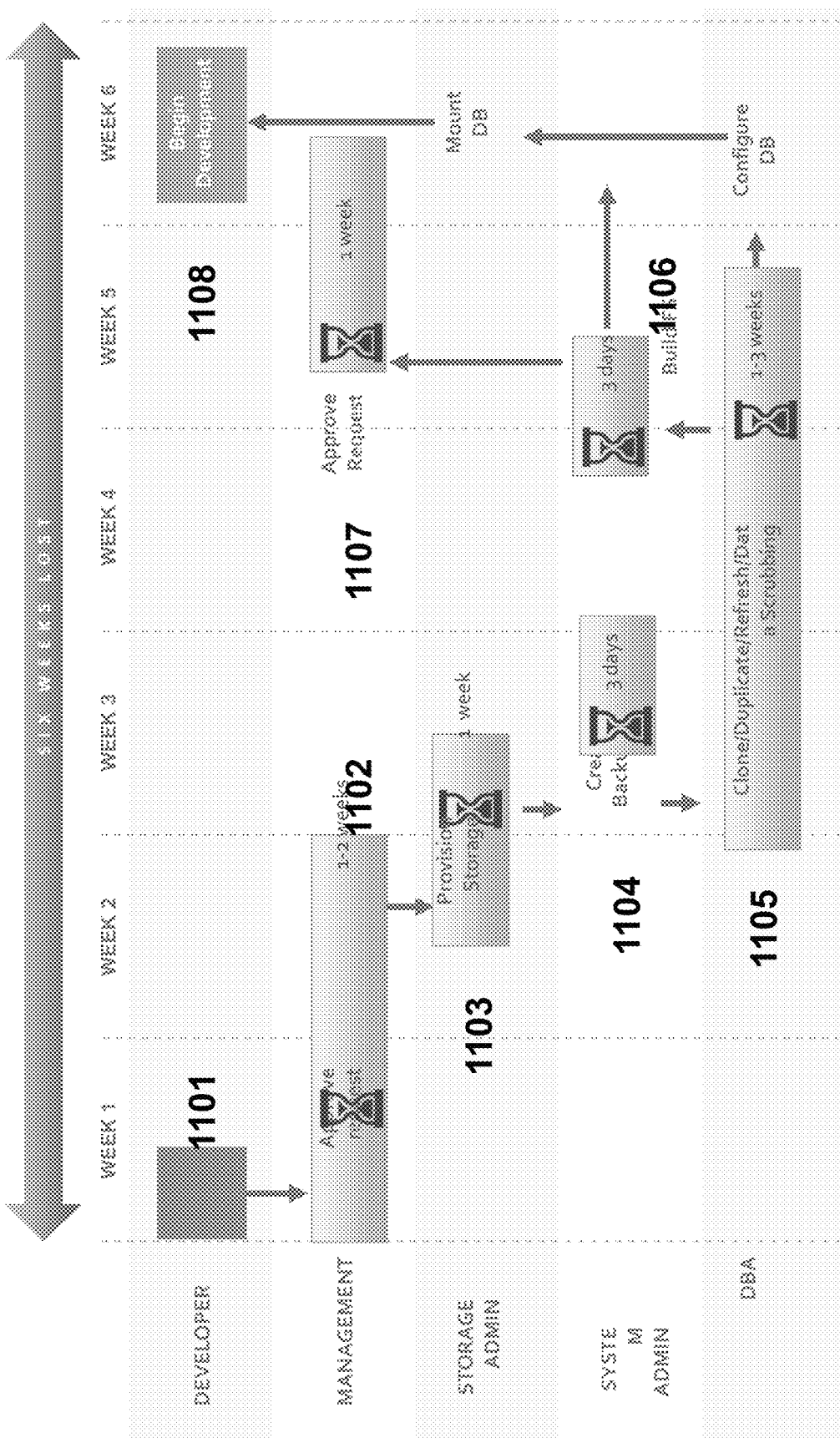
FIG. 11 is an exemplary diagram illustrating traditional process of provisioning Test or Development environment, according to some embodiments of the present disclosure.

FIG. 11 illustrates the traditional process for provisioning test and development environment. In this process, a developer requests a new development environment in week 1 at step 1101. Request then goes to management for approval. Management approves the request at step 1102. The request from management typically takes 1-2 weeks. Upon management approval, Storage Administrator provisions new storage for development environment at step 1103. This may take up to a week. System Administrator then mounts the newly provisioned storage to a server at step 1104. He builds a file system on the provisioned server at step 1106. Database Administrator creates a backup of production database and scrubs it at step 1105. The scrubbed database is then restored or rendered operational on the development server. This process may take database administrator 1-3 weeks. In this scheme, most of the time is spent in waiting for certain actions to happen and handoffs between various people. On average up to 6 weeks are lost waiting for development environment to be provisioned. The time wasted here affects development project schedule.

Figure 12:
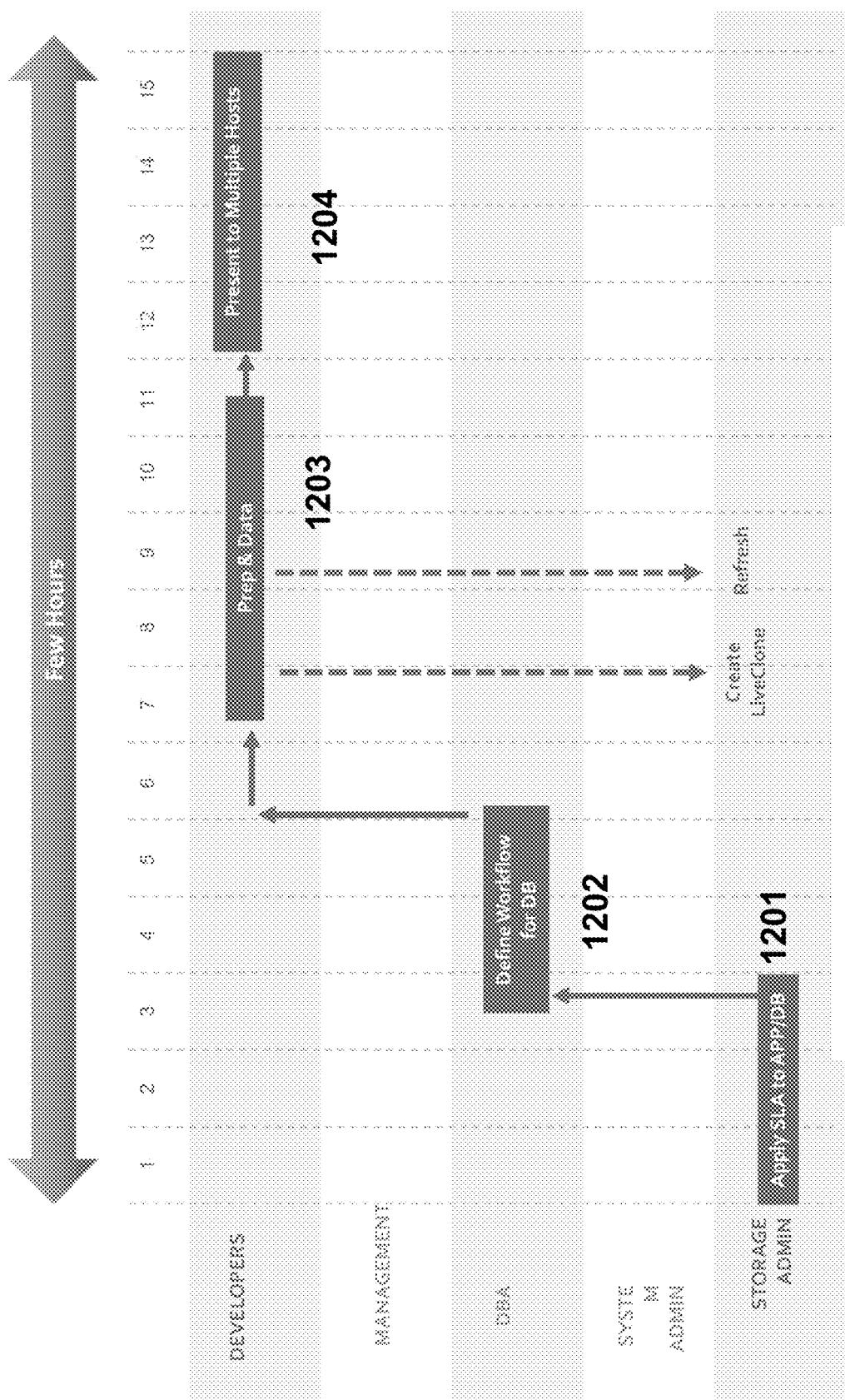
FIG. 12 is an exemplary diagram illustrating a process of provisioning test or development environment using a data management virtualization platform, according to some embodiments of the present disclosure.

FIG. 12 is an exemplary diagram illustrating process of provisioning test or development environment using a data management virtualization platform, as described herein. Storage Administrator applies predefined SLA to application to capture application data at step 1201. This is a fairly simple one-time process. Once SLA is applied to an application, application data is captured in data management virtualization platform per a defined SLA. Database administrator defines policies for provisioning a development environment at step 1202. These policies are defined as a workflow that developers can run when needed. Once backup image for an application is available and workflow is defined, a developer can start provisioning of development environment at step 1203 by running the predefined workflow. Workflow scrubs the sensitive data at step 1203 and then provisions development environment on selected server at step 1204.

Figure 13:
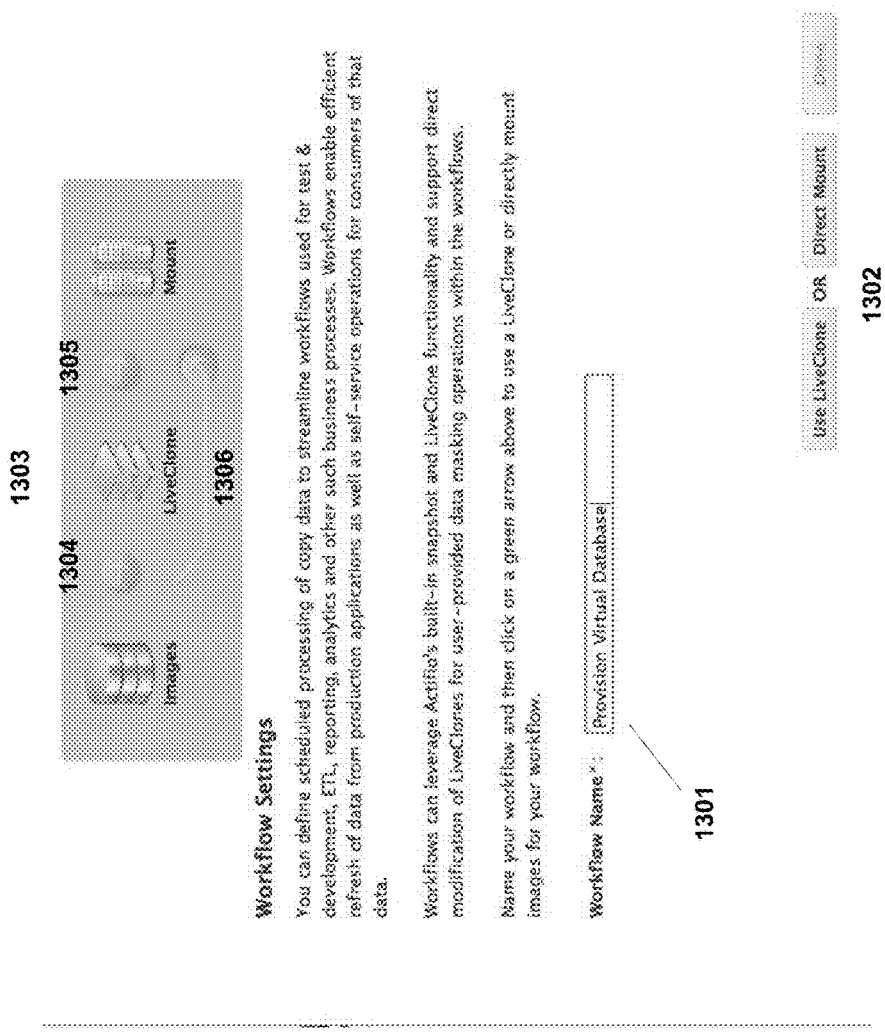
FIG. 13 is a screenshot showing a user interface for configuring workflow settings, according to some embodiments of the present disclosure.

FIG. 13 is a screenshot showing a user interface for defining a workflow, according to some embodiments of the present disclosure. FIG. 13 shows a text field for workflow name 1301, selection button for workflow type 1302, a pictorial representation 1303 showing the type of workflow selected. LiveClone arrows 1304 1035 indicate the Live-Clone workflow and the arrow at the bottom 1306 indicates a direct mount workflow.

Figure 14:
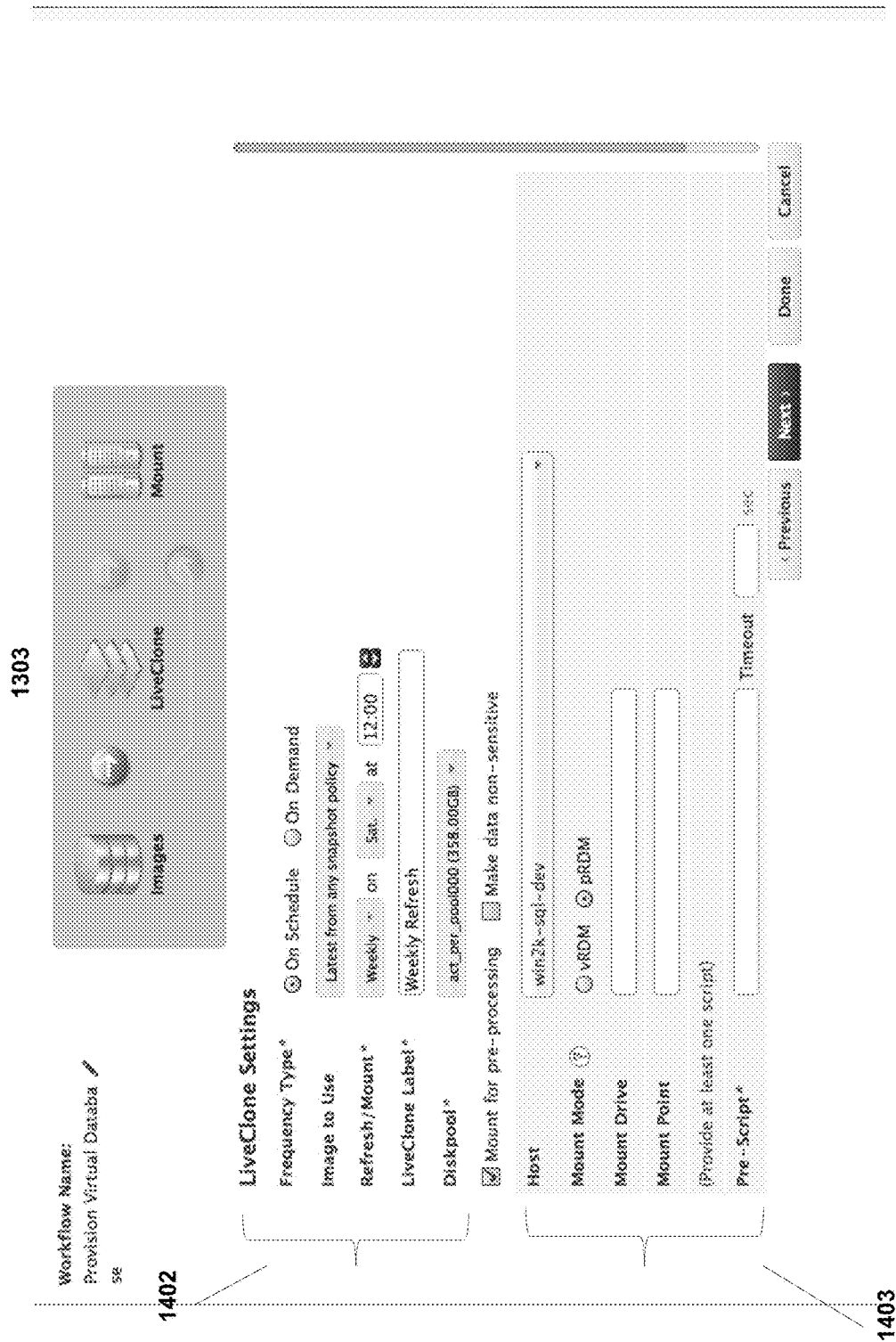
FIG. 14 is a screenshot showing a user interface for configuring live clone settings, according to some embodiments of the present disclosure.

FIG. 14 is a screenshot showing a user interface for configuring live clone settings, according to some embodiments of the present disclosure. Workflow options 1402 allow user to specify options that are specific to this workflow definition such as a frequency type, referring in some embodiments to a type of workflow (e.g., scheduled or on-demand), refresh/mount, referring in some embodiments to a schedule for workflow if the workflow is scheduled, an image to use, referring in some embodiments to image selection for a scheduled workflow run (such as latest image produced by a particular policy), label for liveclone, and a disk pool for liveclone, a pool of storage where the live clone is stored. Data scrubbing options 1403 allow user to enable data scrubbing and specify options for data scrubbing such as host where data scrubbing is performed, mount mode for virtual environments, mount drive or mount point for mounted image on the scrubbing host, pre and post script names that will be invoked for data scrubbing and whether the resultant liveclone should be marked as nonsensitive after data scrubbing.

Figure 15:
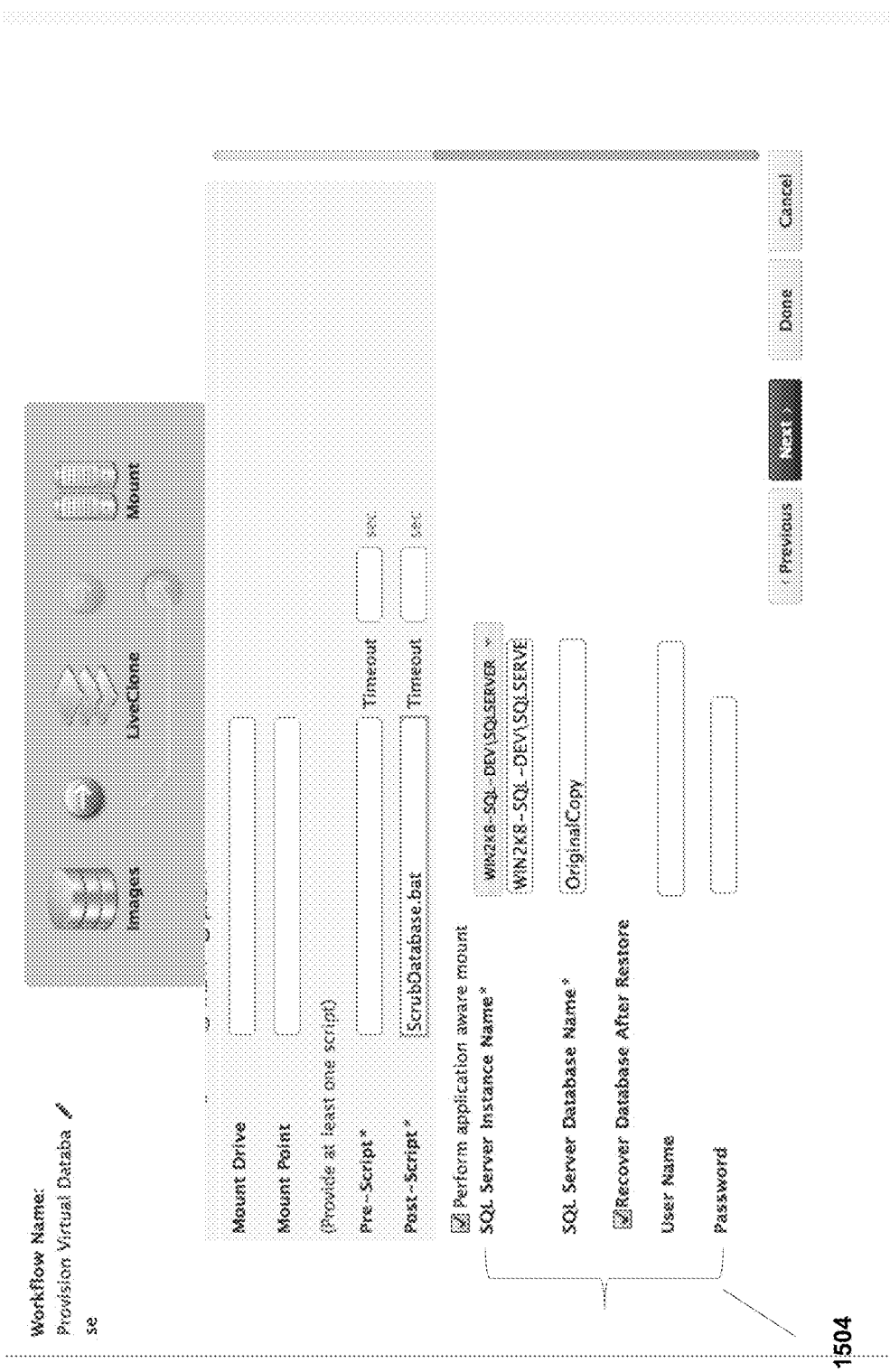
FIG. 15 is a screenshot showing a user interface for configuring a provision of a virtual database, according to some embodiments of the present disclosure.

FIG. 15 is a screenshot showing a user interface for configuring provisioning of a virtual database for scrubbing, according to some embodiments of the present disclosure. Users can specify provisioning options 1504 such as SQL Server Instance name, SQL Server database name, Recover database after restore, username and password. These options are described in greater detail above. The options presented here are based on the application class for the application this workflow is being configured. The parameters listed here can change depending on the application class. The screenshot shows provisioning options for SQL Server database. If this application were an Oracle database, the list of parameters presented here will be for provisioning an Oracle database.

Figure 16:
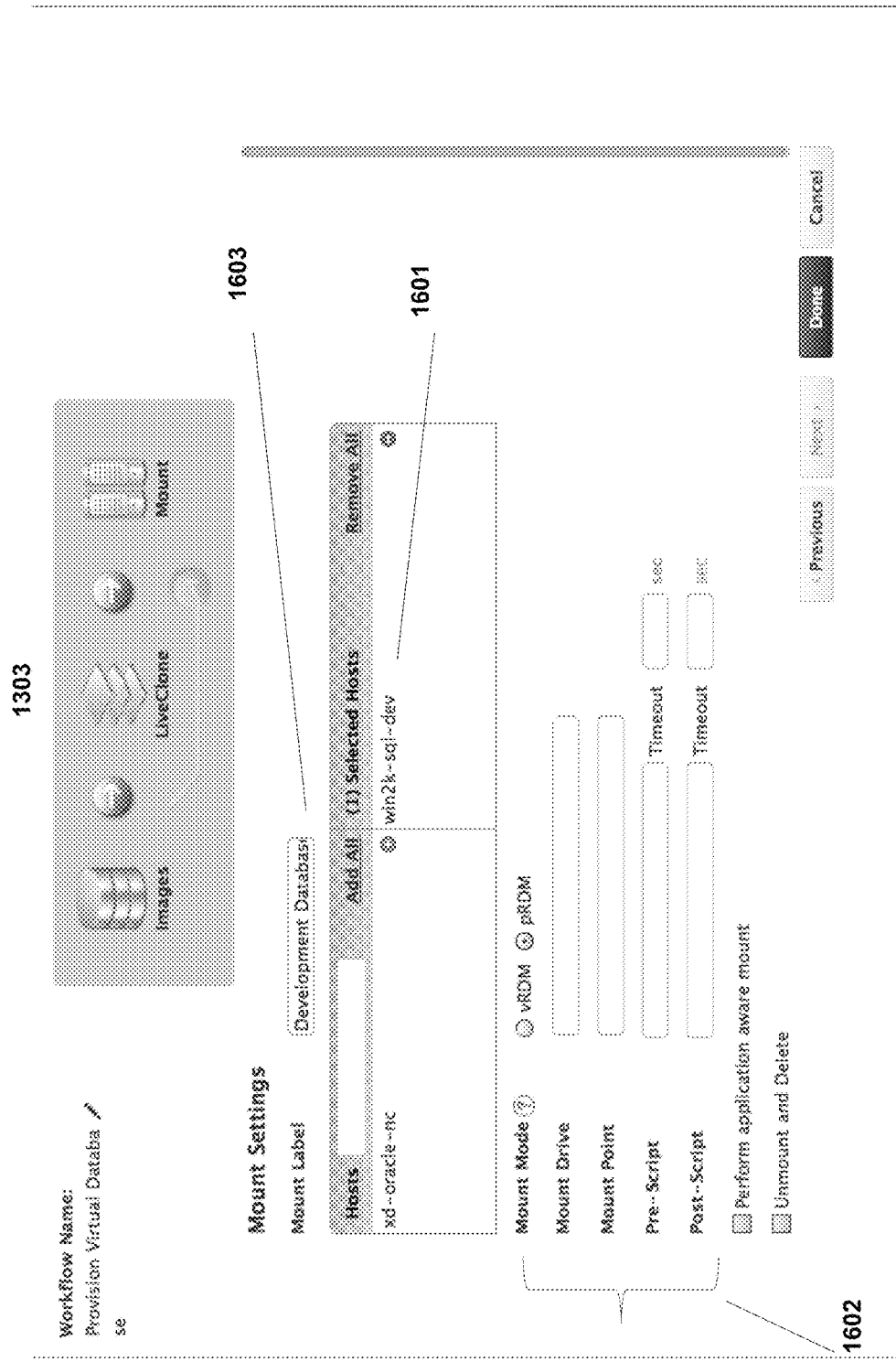
FIG. 16 is a screenshot showing a user interface for configuring a provision of a virtual database, according to some embodiments of the present disclosure.

FIG. 16 is a screenshot showing a user interface for configuring mount settings for provisioning a virtual database, according to some embodiments of the present disclosure. Host selection widget 1601 allows user to select target host for provisioning a virtual database. In this list, user is presented a list of hosts that user has access to. Mount options 1602 allow users to specify mount parameters such as mount mode for virtual machines, mount drive or mount point for mounting backup image and pre/post script to be invoked during mount operation. Users can also specify a label 1603 for mounted image. Once all the settings are specified, user selects Done to complete workflow definition.

Figure 17:
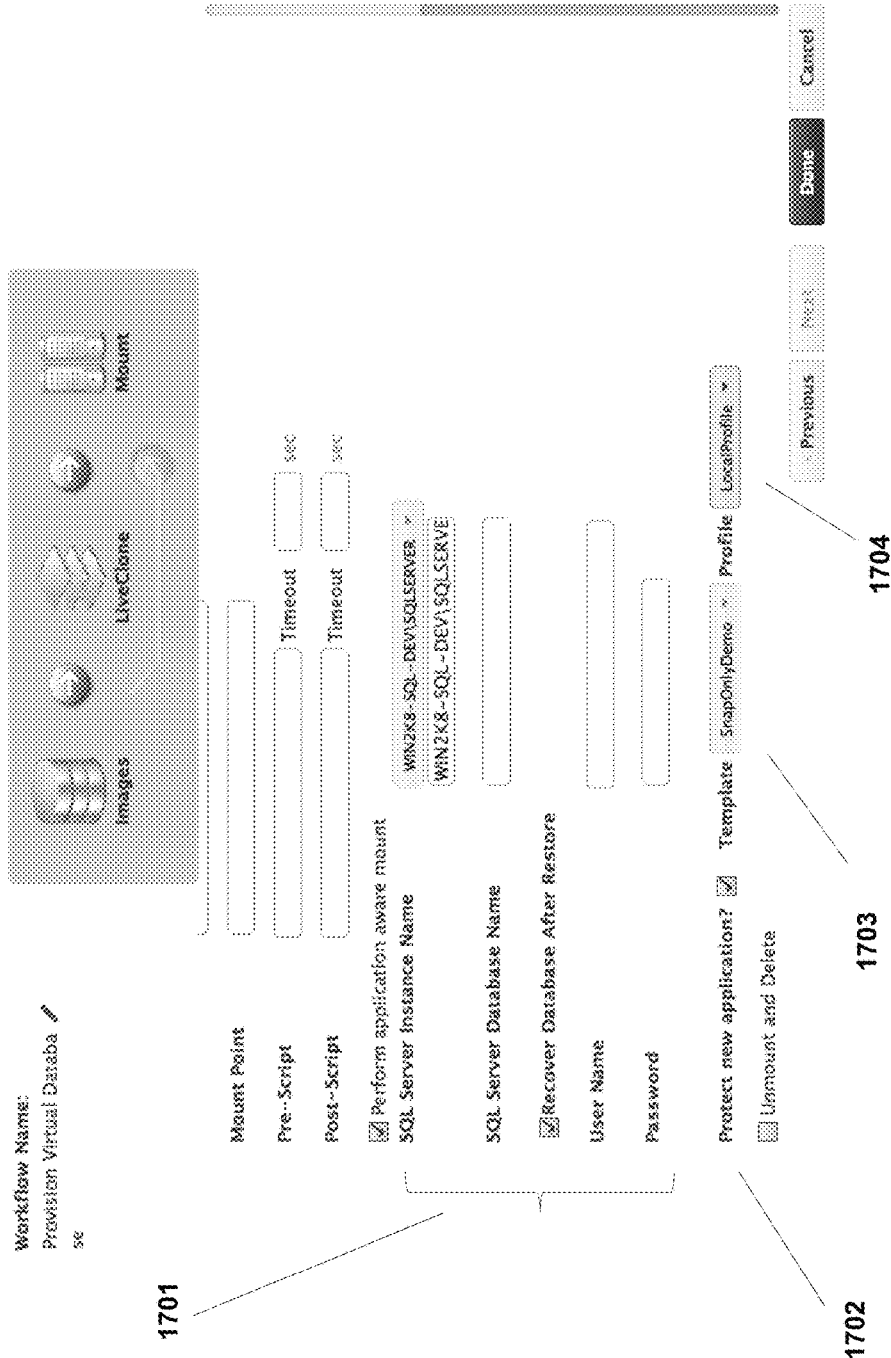
FIG. 17 is a screenshot showing a user interface for configuring a provision of a virtual database, according to some embodiments of the present disclosure.

FIG. 17 is a screenshot showing a user interface for configuring a provision of a virtual database, according to some embodiments of the present disclosure. Users can specify provisioning options 1701 for provisioning a virtual database. These options are the same as provisioning options described above. The only difference is that this provisioning of virtual application is happening on a server that is different from the one described above. Users can also protect the newly provisioned application by selecting Protect new application 1702 checkbox. Users can select predefined policy template 1703 and resource profile 1704 for protecting the new application.

If Administrator selects 'Protect New Application' option while defining workflow; all the development work performed in the provisioned development environment is automatically saved per selected policy. Non-privileged development user can also save development work in progress on demand if they have right to capture data on Data Management Virtualization platform. This offers two benefits. Firstly, it protects users from any unexpected failures. Secondly, it allows developers to roll their development environment to any of the saved states.

This workflow allows administrators to enforcement organizational policies for data access while allowing users to provision new development environment or refresh existing environment as and when needed. Use of virtual copy of database for provisioning development environments reduces the storage required for provisioning development environment. Reduction in number of copies of production data reduces the surface area of attack for hackers.

Self service provisioning capabilities offered by automated workflows enable development team to reduce time required to complete development projects.

Figure 18:
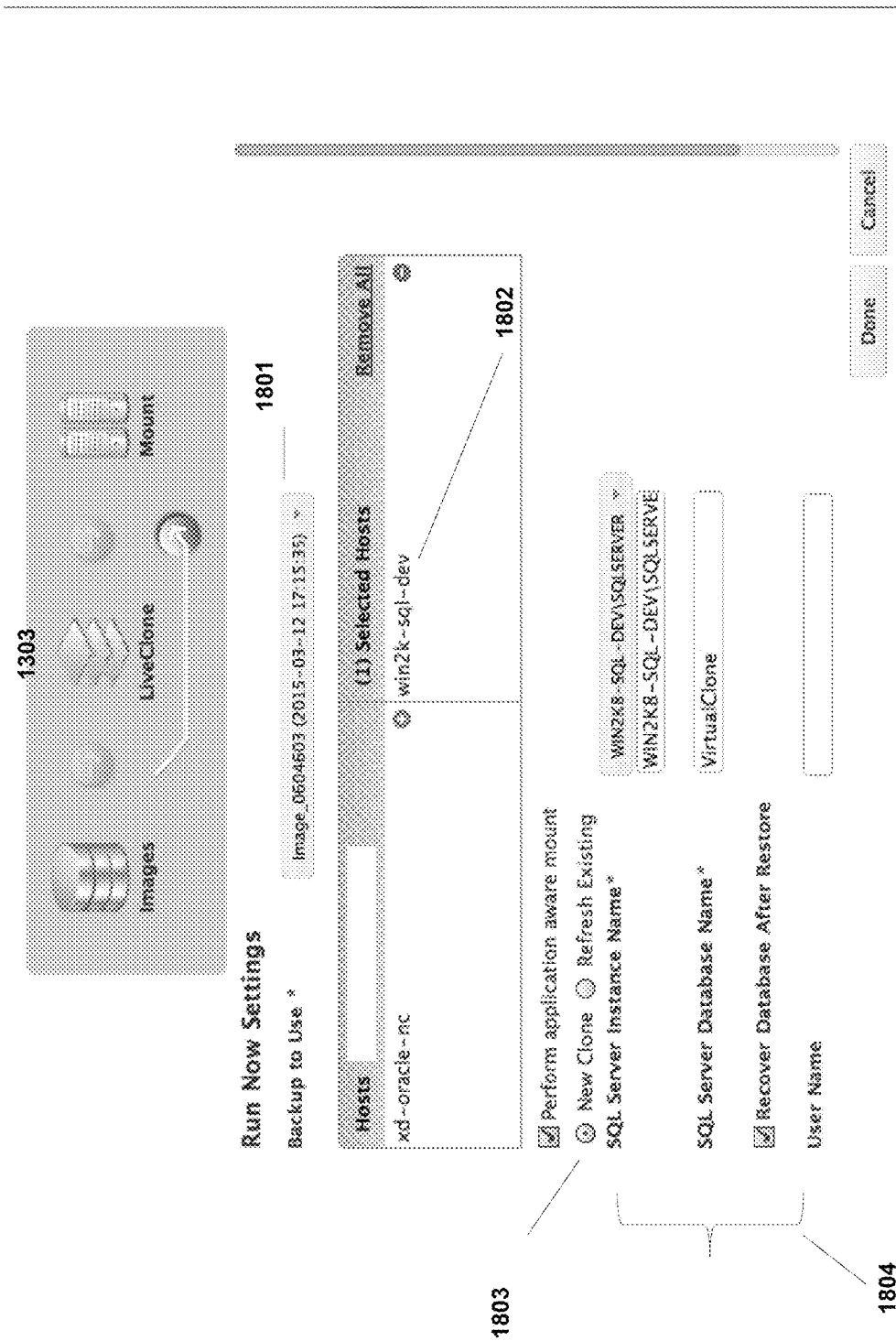
FIG. 18 is an exemplary diagram illustrating the process of provisioning test or development environment by a non-privileged user, according to some embodiments of the present disclosure.

FIG. 18 illustrates the process of provisioning Test or Development environment by a non-privileged user, according to some embodiments of the present disclosure. A developer selects a workflow predefined by administrator and runs the workflow to provision his development environment. Administrator selects backup for provisioning development environment at step 1801, selects his development server at step 1802, selects new clone option at step 1803 and finally specifies provisioning options at step 1804. Once the Administrator selects Done, data management virtualization engine and connector orchestrate the provisioning of the development environment. The application provisioning process can be the same process as described herein (e.g., as shown in FIG. 2 and its associated description). Once the application provisioning process completes successfully, data management virtualization engine discovers the newly provisioned application automatically and protects it using selected SLA.

If administrator defines a workflow that requires data scrubbing before development environment is provisioned, data management virtualization engine automatically invokes a data scrubbing operation and scrubs data using settings defined by administrator in the workflow. In some embodiments, if the data scrubbing operation fails, provisioning of development environment fails, ensuring that unauthorized users do not get access to sensitive data.

If data scrubbing succeeds, the resultant scrubbed image is marked as nonsensitive automatically by the workflow engine. This ensures that scrubbed image is available to users with nonsensitive data access.

In some embodiments, nonprivileged users can only define parameters specific to their development environment. In some embodiments, nonprivileged users cannot override any policy settings encoded by administrator in the definition of workflow.

Any number of users can run a predefined workflow in parallel to provision their own development environment.

During the course of development project, developer may want to get access to fresh copy of production data. Workflow allows user to refresh previously provisioned development environment using a newer copy of production data.

Figure 19:
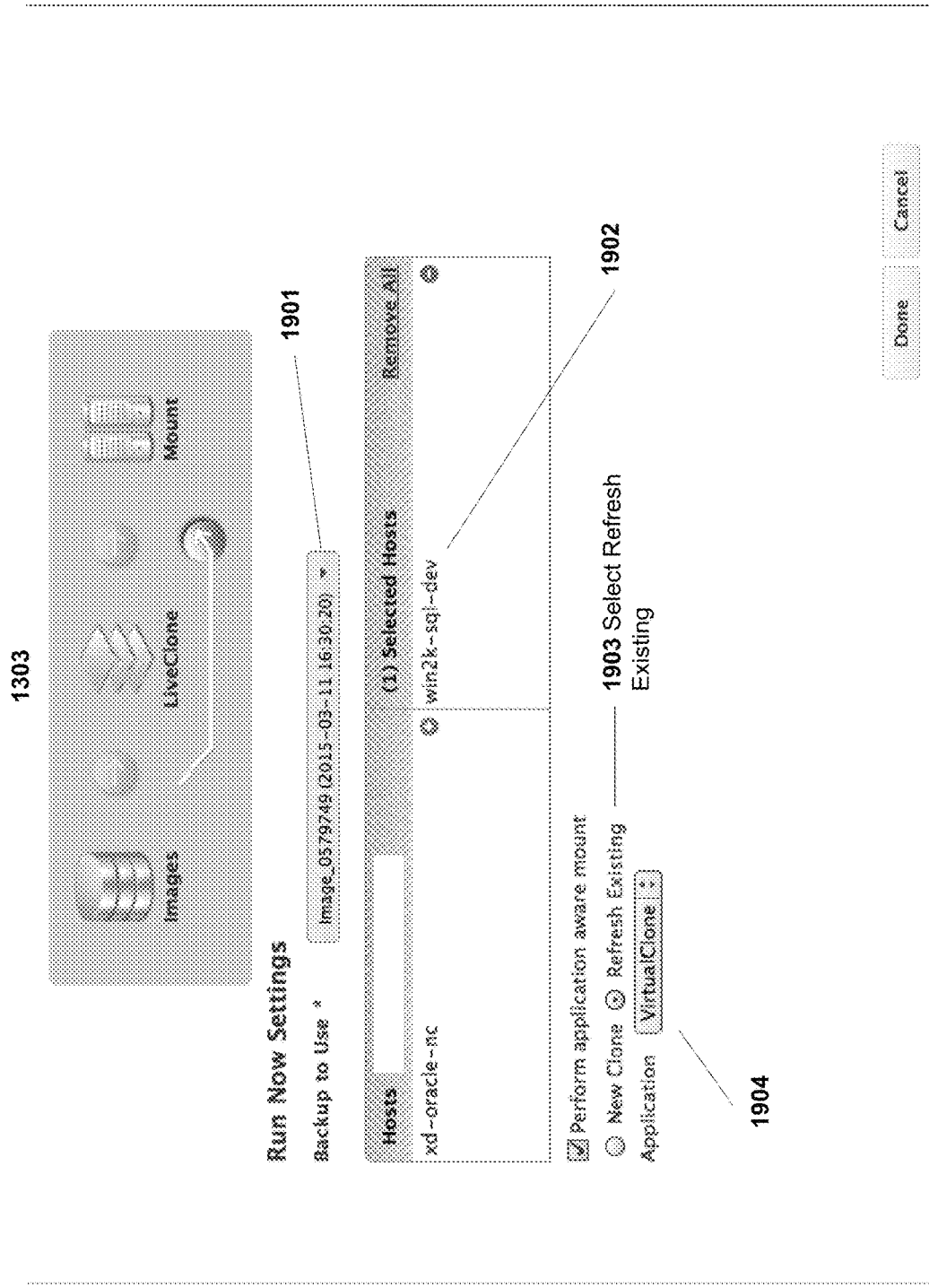
FIG. 19 is an exemplary diagram illustrating the process of refreshing previously provisioned test or development environment by a non-privileged user, according to some embodiments of the present disclosure.

FIG. 19 illustrates the process of refreshing existing development environment using workflow, according to some embodiments of the present disclosure. To refresh a development environment, a developer runs a predefined workflow and selects backup image for refresh at step 1901, selects target server at step 1902, selects 'Refresh Existing' at step 1903 and finally selects application to refresh at step 1904. Once the developer hits done, the refresh process starts. During the refresh process, data management virtualization engine data management virtualization engine tears down the existing development environment. This tear down involves application specific action depending on the application that is getting refreshed. For SQL Server database, this step will detach the database from SQL Server instance. Data management virtualization engine then unmounts the previously mounted virtual copy from the target server and unmaps the storage LUN from the target server. Once the previously mounted copy is successfully removed from the target server, data management virtualization engine scrubs new copy of data if needed and then mounts the scrubbed copy to target server. Connector on the target server then provisions the new application instance. The steps involved here are the same as described above.

In some embodiments, there is no data copy involved during refresh of a development environment. That is, a refresh of a development environment is quick and saves developers valuable time.

Use of predefined scrubbing workflow allows non-privileged users to get access to copy of production data as needed on a self service basis even if production data contains sensitive information without violating business policies. Reduction in number of copies of sensitive data reduces exposure of businesses to unwanted litigation.

Once a virtual application is provisioned using the data management virtualization engine using the steps described above, any changes made to that virtual application can be backed up using pre-defined SLA. This process is the same as process of capturing production data described above. Backups of this new virtual application containing modified data can then be used to provision additional new virtual applications. This cascading chain of virtual applications can go up to any arbitrary depth and is only limited by the infrastructure such as storage, memory etc. to serve the cascading chain of virtual applications. This ability to cascade virtual applications allows easy promotion of applications through various phases of application development lifecycle such as development, functional testing, user acceptance testing, performance testing, pre-production testing etc.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A computerized method for automating a provision of applications from a source to a target by providing a virtual copy of application data, wherein the virtual copy can be adapted to a plurality of different target environments, the computerized method comprising:

maintaining, by a computing device, versions of source application data from an application database at a source production server at times associated with a schedule, wherein a first version of the source application data includes a full copy of the source application data and a subsequent version of the source application data include changes between the subsequent version and a version of the source application data prior to the subsequent version;

receiving, by the computing device, data associated with a request from a user to provision the source application data for a target environment at a target server, the request further comprising application specific parameters that define necessary requirements for the target environment;

presenting, by the computing device, a virtual copy of the source application data to the target server, the virtual copy comprising a snapshot of at least one version of the source application data; and transmitting, by the computing device, instructions to the target server that define how to restore an operational server database from the virtual copy based on the application specific parameters to meet the requirements of the target environment, thereby automating a provision of applications from a source to a target by providing a virtual copy of application data, wherein the virtual copy can be adapted to a plurality of different target environments.

2. The computerized method of claim 1, wherein the virtual copy further comprises a plurality of storage logical unit numbers (LUN) and wherein the instructions include:
   bringing the plurality of storage LUN online; and
   mounting the storage LUN in a format that is the same as a source application format.

3. The computerized method of claim 2, wherein the source application format comprises at least one of a raw device and a file system.

4. The computerized method of claim 1, further comprising:
   determining, by the computing device, at least one sensitivity attribute associated with the source application;
   scrubbing, by the computing device, the source application data to form at least one scrubbed data level copy of the source application data, each of the at least one scrubbed data level copy associated with a level of scrubbing of sensitive data associated with each of the at least one sensitivity attribute;
   determining, by the computing device, a user data access level associated with the request; and
   providing, by the computing device, access to one of the source application or one of the at least one scrubbed data level copy based on the user data access level.

5. The computerized method of claim 4, wherein the application database at the source production server further comprises additional application data, the additional application data associated with an additional application data sensitivity attribute, the computerized method further comprising:
   determining, by the computing device, the sensitivity attribute of the additional application data does not match the user data access level, and
   denying, by the computing device, access by the user to the additional application data.

6. The computerized method of claim 1, wherein the source application data includes data associated with an application class, and the application class defines the application specific parameters.

7. The computerized method of claim 1, wherein the operational server database is used for at least one of test and development, a database integrity check, generating reports, and analytics.

8. The computerized method of claim 1, wherein the application database comprises at least one of:
an SQL server database;
an Oracle database; and
a DB2 database.

9. A method of using the computerized method of claim 1 to provision an additional virtual application from the operational server database to meet the requirements of an additional target environment.

10. A computing device for automating a provision of applications from a source to a target by providing a virtual copy of application data, wherein the virtual copy can be adapted to a plurality of different target environments, the computing device comprising:
a processor, the processor configured to run a module stored in memory that is configured to cause the processor to:
maintain versions of source application data from an application database at a source production server at times associated with a schedule, wherein a first version of the source application data includes a full copy of the source application data and a subsequent version of the source application data include changes between the subsequent version and a version of the source application data prior to the subsequent version;
receive data associated with a request from a user to provision the source application data for a target environment at a target server, the request further comprising application specific parameters that define necessary requirements for the target environment;
present a virtual copy of the source application data to the target server, the virtual copy comprising a snapshot of at least one version of the source application data; and
transmit instructions to the target server that define how to restore an operational server database from the virtual copy based on the application specific parameters to meet the requirements of the target environment,
thereby automating a provision of applications from a source to a target by providing a virtual copy of application data, wherein the virtual copy can be adapted to a plurality of different target environments.

11. The computing device of claim 10, wherein the virtual copy further comprises a plurality of storage logical unit numbers (LUN) and wherein the instructions include:
bringing the plurality of storage LUN online; and
mounting the storage LUN in a format that is the same as a source application format.

12. The computing device of claim 11, wherein the source application format comprises at least one of a raw device and a file system.

13. The computing device of claim 10, wherein the processor is further caused to:
determine at least one sensitivity attribute associated with the source application;
scrub the source application data to form at least one scrubbed data level copy of the source application data, each of the at least one scrubbed data level copy associated with a level of scrubbing of sensitive data associated with each of the at least one sensitivity attribute;
determine a user data access level associated with the request; and
provide access to one of the source application or one of the at least one scrubbed data level copy based on the user data access level.

14. The computing device of claim 13, wherein the application database at the source production server further comprises additional application data, the additional application data associated with an additional application data sensitivity attribute, wherein the processor is further caused to:
determine the sensitivity attribute of the additional application data does not match the user data access level, and
deny access by the user to the additional application data.

15. The computing device of claim 10, wherein the source application data includes data associated with an application class, and the application class defines the application specific parameters.

16. A non-transitory computer readable medium having executable instructions operable to cause an apparatus to:
maintain versions of source application data from an application database at a source production server at times associated with a schedule, wherein a first version of the source application data includes a full copy of the source application data and a subsequent version of the source application data include changes between the subsequent version and a version of the source application data prior to the subsequent version;
receive data associated with a request from a user to provision the source application data for a target environment at a target server, the request further comprising application specific parameters that define necessary requirements for the target environment;
present a virtual copy of the source application data to the target server, the virtual copy comprising a snapshot of at least one version of the source application data; and
transmit instructions to the target server that define how to restore an operational server database from the virtual copy based on the application specific parameters to meet the requirements of the target environment,
thereby automating a provision of applications from a source to a target by providing a virtual copy of application data, wherein the virtual copy can be adapted to a plurality of different target environments.

17. The non-transitory computer readable medium of claim 16, wherein the virtual copy further comprises a plurality of storage logical unit numbers (LUN) and wherein the instructions include:
bringing the plurality of storage LUN online; and
mounting the storage LUN in a format that is the same as a source application format.

18. The non-transitory computer readable medium of claim 17, wherein the source application format comprises at least one of a raw device and a file system.

19. The non-transitory computer readable medium of claim 16, wherein the apparatus is further caused to:
determine at least one sensitivity attribute associated with the source application;
scrub the source application data to form at least one scrubbed data level copy of the source application data, each of the at least one scrubbed data level copy associated with a level of scrubbing of sensitive data associated with each of the at least one sensitivity attribute;

determine a user data access level associated with the request; and provide access to one of the source application or one of the at least one scrubbed data level copy based on the user data access level.

20. The non-transitory computer readable medium of claim 16, wherein the application database at the source production server further comprises additional application data, the additional application data associated with an additional application data sensitivity attribute, wherein the apparatus is further caused to:

determine the sensitivity attribute of the additional application data does not match the user data access level, and deny access by the user to the additional application data.

* * * * *